(12) United States Patent
Montojo et al.

(10) Patent No.: US 8,681,719 B2
(45) Date of Patent: Mar. 25, 2014

(54) SYSTEMS, APPARATUS AND METHODS FOR FACILITATING FREQUENCY REUSE FOR DOWNLINK CONTROL CHANNELS

(75) Inventors: Juan Montojo, San Diego, CA (US); Wanshi Chen, San Diego, CA (US); Aleksandar Damnjanovic, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 468 days.

(21) Appl. No.: 12/910,551

(22) Filed: Oct. 22, 2010

(65) Prior Publication Data

US 2012/0099489 A1    Apr. 26, 2012

(51) Int. Cl.
*H04Q 7/00*    (2006.01)
(52) U.S. Cl.
USPC ............ 370/329; 370/252; 370/254; 370/260
(58) Field of Classification Search
USPC .................................. 370/254, 319
See application file for complete search history.

(56) References Cited

U.S. PATENT DOCUMENTS

| | | | |
|---|---|---|---|
| 2009/0088148 A1 | 4/2009 | Chung et al. | |
| 2009/0154580 A1* | 6/2009 | Ahn et al. | 375/260 |
| 2009/0238131 A1 | 9/2009 | Montojo et al. | |
| 2009/0241004 A1 | 9/2009 | Ahn et al. | |
| 2010/0173637 A1 | 7/2010 | Damnjanovic et al. | |
| 2010/0195583 A1 | 8/2010 | Nory et al. | |
| 2010/0214943 A1* | 8/2010 | Immendorf et al. | 370/252 |
| 2010/0322109 A1* | 12/2010 | Ahn et al. | 370/254 |

FOREIGN PATENT DOCUMENTS

| | | |
|---|---|---|
| EP | 2091289 A2 | 8/2009 |
| WO | 2009056943 A2 | 5/2009 |
| WO | 2009099289 A2 | 8/2009 |
| WO | 2010011104 | 1/2010 |
| WO | 2010041993 A1 | 4/2010 |

OTHER PUBLICATIONS

3GPP Draft; R1-093814, "ZTE: Considerations on Control Channel of Backhaul Link", 3rd Generation Partnership Project (3GPP), Mobile Competence Centre ; 650, Route Des Lucioles ; F-06921 Sophia-Antipolis Cedex ; France, Oct. 12, 2009, XP050388327, [retrieved on Oct. 5, 2009].

(Continued)

*Primary Examiner* — Wanda Z Russell
(74) *Attorney, Agent, or Firm* — Paul Kuo

(57) ABSTRACT

Systems and methods for frequency reuse on downlink control channels (DLCCs) are provided. One method can include determining a first number of symbols to support transmission of control information on a DLCC, and configuring a second number of symbols for transmission of the control information on the DLCC, wherein the second number of symbols is greater than the first number of symbols. The method can also include assigning a number of DLCCs based on the second number of symbols, and transmitting control information over an assigned number of DLCCs to achieve an effective reuse factor less than one. Another method can include identifying fractions of bandwidth in a system having cells, and allocating at least one of the cells to at least one of the fractions of bandwidth in a system. Resource element groups allocated to the fractions of bandwidth can be coordinated across cells to provide frequency reuse.

32 Claims, 13 Drawing Sheets

(56) References Cited

OTHER PUBLICATIONS

3GPP TS 36.211, "LTE; Evolved Universal Terrestrial Radio Access (E-UTRA); Physical channels and modulation (3GPP TS 36.211 version 9.1.0 Release 9)", Technical Specification, European Telecommunications Standards Institute (ETSI), Version 9.1.0, 650, Route Des Lucioles; F-06921 Sophia-Antipolis; France, Apr. 1, 2010, XP014046895, 6.7.

3GPP TS 36.212, "LTE; Evolved Universal Terrestrial Radio Access (E-UTRA); Multiplexing and channel coding (3GPP TS 36.212 version 9.3.0 Release 9)", Technical Specification, European Telecommunications Standards Institute (ETSI), Version 9.3.0, Route Des Lucioles; F-06921 Sophia-Antipolis; France, Oct. 1, 2010, XP014061702, abstract.

3GPP TS 36.213, "LTE; Evolved Universal Terrestrial Radio Access (E-UTRA); Physical layer procedures (3GPP TS 36.213 version 9.3.0 Release 9)", Technical Specification, European Telecommunications Standards Institute (ETSI), Version 9.3.0, 650, Route Des Lucioles; F-06921 Sophia-Antipolis; France, Oct. 1, 2010, XP014061703, abstract.

International Search Report and Written Opinion—PCT/US2011/057390—ISA/EPO—Jun. 11, 2012.

* cited by examiner

SYSTEMS, APPARATUS AND METHODS FOR FACILITATING FREQUENCY REUSE FOR DOWNLINK CONTROL CHANNELS

BACKGROUND

I. Field

The following description relates to wireless communications, in general, and to facilitating frequency reuse for downlink control channels in wireless communication systems, in particular.

II. Background

Wireless communication systems are widely deployed to provide various types of communication. For instance, voice and/or data can be provided via such wireless communication systems. A typical wireless communication system, or network, can provide multiple users access to one or more shared resources (e.g., bandwidth, transmit power). For instance, a system can use a variety of multiple access techniques such as Frequency Division Multiplexing (FDM), Time Division Multiplexing (TDM), Code Division Multiplexing (CDM), Orthogonal Frequency Division Multiplexing (OFDM), and others.

Generally, wireless multiple access communication systems can simultaneously support communication for multiple user equipment (UEs). Each UE can communicate with one or more base stations (BSs) via transmissions on forward and reverse links. The forward link (or downlink (DL)) refers to the communication link from BSs to UEs, and the reverse link (or uplink (UL)) refers to the communication link from UEs to BSs.

Frequency reuse in the communication systems enables enhanced cell edge coverage and, when combined with dynamic channel information feedback and traffic information, may improve total cell throughput as well. In Long Term Evolution (LTE) Release 8 systems, implementing frequency reuse for data transmissions over a Physical Downlink Shared Channel (PDSCH) or a Physical Uplink Shared Channel (PUSCH) can be relatively straightforward due to the existence of subband-based channel quality information feedback, and X2-based backhaul information exchange.

However, it is not straightforward to achieve frequency reuse for LTE DL control channels. Systems, apparatus and methods for facilitating frequency reuse for DL control channels are therefore desirable.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with one or more embodiments and corresponding disclosure thereof, various aspects are described in connection with facilitating frequency reuse for DL control channels.

According to related aspects, a method is provided. In some embodiments, the method can include determining a first number of symbols to support transmission of control information on a downlink control channel, wherein the first number of symbols to support transmission of control information on a downlink control channel is a minimum number for supporting transmission; configuring a second number of symbols for transmission of the control information on the downlink control channel, wherein the second number of symbols for transmission of control information on the downlink control channel is greater than the first number of symbols; and assigning a number of downlink control channels based, at least, on the second number of symbols for transmission of control information on the downlink control channel, wherein the number of downlink control channels based, at least, on the second number of symbols for transmission of control information on the downlink control channel is increased relative to a number of downlink control channels corresponding to the first number of symbols to support transmission of control information on a downlink control channel.

According to other related aspects, a computer program product is provided. The computer program product can include a computer-readable medium including a first set of codes for causing a computer to determine a first number of symbols to support transmission of control information on a downlink control channel, wherein the first number of symbols to support transmission of control information on a downlink control channel is a minimum number for supporting transmission; a second set of codes for causing the computer to configure a second number of symbols for transmission of control information on the downlink control channel, wherein the second number of symbols for transmission of control information on the downlink control channel is greater than the first number of symbols; and a third set of codes for causing the computer to assign a number of downlink control channels based, at least, on the second number of symbols for transmission of control information on the downlink control channel, wherein the number of downlink control channels based, at least, on the second number of symbols for transmission of control information on the downlink control channel is increased relative to a number of downlink control channels corresponding to the first number of symbols to support transmission of control information on a downlink control channel.

According to other related aspects, an apparatus is provided. The apparatus can include means for determining a first number of symbols to support transmission of control information on a downlink control channel, wherein the first number of symbols to support transmission of control information on a downlink control channel is a minimum number for supporting transmission; means for configuring a second number of symbols for transmission of control information on the downlink control channel, wherein the second number of symbols for transmission of control information on the downlink control channel is greater than the first number of symbols; and means for assigning a number of downlink control channels based, at least, on the second number of symbols for transmission of control information on the downlink control channel, wherein the number of downlink control channels based, at least, on the second number of symbols for transmission of control information on the downlink control channel is increased relative to a number of downlink control channels corresponding to the first number of symbols to support transmission of control information on a downlink control channel.

According to yet other related aspects, another apparatus is provided. The apparatus can include a resource allocation module configured to: determine a first number of symbols to support transmission of control information on a downlink control channel, wherein the first number of symbols to support transmission of control information on a downlink control channel is a minimum number for supporting transmission; configure a second number of symbols for transmission of control information on the downlink control channel, wherein the second number of symbols for transmission of control information on the downlink control channel is greater than the first number of symbols; and assign a number of downlink control channels based, at least, on the second number of symbols for transmission of control information on the downlink control channel, wherein the number of downlink control channels based, at least, on the second number of symbols for transmission of control information on the downlink control channel is increased relative to a number of downlink control channels corresponding to the first number of symbols to support transmission of control information on a downlink control channel.

According to other aspects, a method can include: identifying a plurality of fractions of bandwidth in a system, wherein the system includes a plurality of cells; and allocating at least one of the plurality of cells to at least one of the plurality of fractions of bandwidth in a system, wherein resource element groups allocated to the plurality of fractions of bandwidth in a system are coordinated across the plurality of cells to provide frequency reuse of bandwidth in the system.

According to yet other aspects, another computer program product is provided. The computer program product includes a computer-readable medium. The computer-readable medium can include a first set of codes for causing a computer to identify a plurality of fractions of bandwidth in a system, wherein the system includes a plurality of cells; and a second set of codes for causing the computer to allocate at least one of the plurality of cells to at least one of the plurality of fractions of bandwidth in a system, wherein resource element groups allocated to the plurality of fractions of bandwidth in a system are coordinated across the plurality of cells to provide frequency reuse of bandwidth in the system.

According to other aspects, another apparatus is provided. The apparatus can include means for identifying a plurality of fractions of bandwidth in a system, wherein the system includes a plurality of cells; and means for allocating at least one of the plurality of cells to at least one of the plurality of fractions of bandwidth in a system, wherein resource element groups allocated to the plurality of fractions of bandwidth in a system are coordinated across the plurality of cells to provide frequency reuse of bandwidth in the system.

According to yet other aspects, another apparatus is provided. The apparatus can include a resource allocation module configured to: identify a plurality of fractions of bandwidth in a system, wherein the system includes a plurality of cells; and allocate at least one of the plurality of cells to at least one of the plurality of fractions of bandwidth in a system, wherein resource element groups allocated to the plurality of fractions of bandwidth in a system are coordinated across the plurality of cells to provide frequency reuse of bandwidth in the system.

According to still other aspects, another method is provided. The method can include receiving, by a UE in a cell of a plurality of cells, information indicative of an allocation of the cell of the plurality of cells to at least one of a plurality of fractions of bandwidth in a system, wherein resource element groups allocated to the plurality of fractions of bandwidth in a system are coordinated across the plurality of cells to provide frequency reuse of bandwidth in the system.

According to still other aspects, a computer program product is provided. The computer program product includes a computer-readable medium, comprising: a first set of codes for causing a computer to receive, by UE including the computer and in a cell of a plurality of cells, information indicative of an allocation of the cell of the plurality of cells to at least one of a plurality of fractions of bandwidth in a system, wherein resource element groups allocated to the plurality of fractions of bandwidth in a system are coordinated across the plurality of cells to provide frequency reuse of bandwidth in the system.

According to still other embodiments, another apparatus is provided. The apparatus can include: means for receiving, by the apparatus in a cell of a plurality of cells, information indicative of an allocation of the cell of the plurality of cells to at least one of a plurality of fractions of bandwidth in a system, wherein resource element groups allocated to the plurality of fractions of bandwidth in a system are coordinated across the plurality of cells to provide frequency reuse of bandwidth in the system.

According to yet other embodiments, another apparatus is provided. The apparatus can include: a user equipment resource allocation module in a cell of a plurality of cells and configured to: receive information indicative of an allocation of the cell of the plurality of cells to at least one of a plurality of fractions of bandwidth in a system, wherein resource element groups allocated to the plurality of fractions of bandwidth in a system are coordinated across the plurality of cells to provide frequency reuse of bandwidth in the system.

Toward the accomplishment of the foregoing and related ends, the one or more embodiments comprise the features hereinafter fully described and particularly pointed out in the claims. The following description and the annexed drawings set forth herein detail certain illustrative aspects of the one or more embodiments. These aspects are indicative, however, of but a few of the various ways in which the principles of various embodiments can be employed and the described embodiments are intended to include all such aspects and their equivalents.

DETAILED DESCRIPTION

Figure 1:
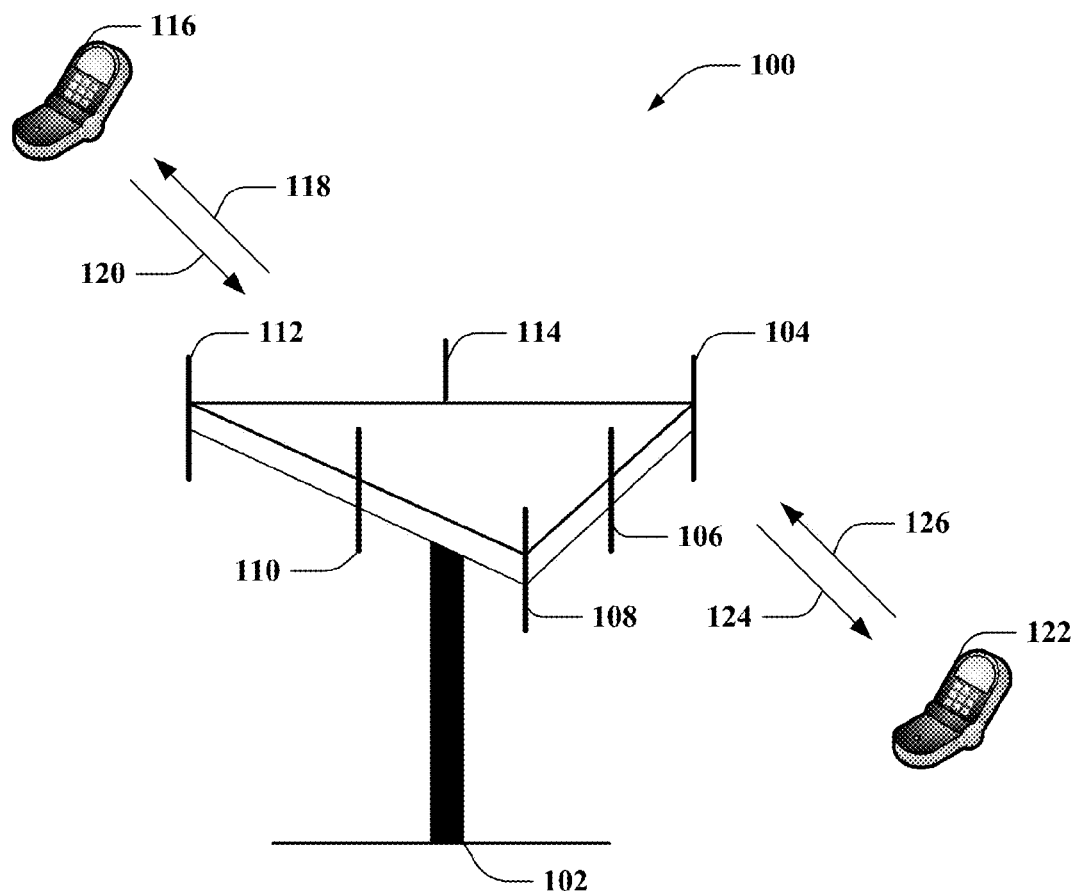
FIG. 1 is an illustration of an example wireless communication system facilitating frequency reuse for DL control channels.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiments may be practiced without these specific details. In other instances, well-known structures and devices are shown in block diagram form in order to facilitate describing one or more embodiments.

As used in this application, the terms "component," "module," "system," and the like are intended to refer to a computer-related entity, either hardware, firmware, a combination of hardware and software, software and/or software in execution. For example, a component can be, but is not limited to being, a process running on a processor, a processor, an object, an executable, a thread of execution, a program, and/or a computer. By way of illustration, both an application running on a computing device and/or the computing device can be a component. One or more components can reside within a process and/or thread of execution and a component can be localized on one computer and/or distributed between two or more computers. In addition, these components can execute from various computer-readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

The techniques described herein can be used for various wireless communication systems such as code division multiple access (CDMA), time division multiple access (TDMA), frequency division multiple access (FDMA), orthogonal frequency division multiple access (OFDMA), single carrier-frequency division multiple access (SC-FDMA) and/or other systems. The terms "system" and "network" are often used interchangeably. A CDMA system can implement a radio technology such as Universal Terrestrial Radio Access (UTRA), CDMA8020, etc. UTRA includes Wideband-CDMA (W-CDMA) and other variants of CDMA. CDMA8020 covers IS-8020, IS-95 and IS-856 standards. An OFDMA system can implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is an upcoming release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, CDMA8020 and UMB are described in documents from an organization named "3rd Generation Partnership Project 2" (3GPP2). Further, such wireless communication systems can additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Single carrier frequency division multiple access (SC-FDMA) utilizes single carrier modulation and frequency domain equalization. SC-FDMA can have similar performance and essentially the same overall complexity as those of an OFDMA system. A SC-FDMA signal can have lower peak-to-average power ratio (PAPR) because of its inherent single carrier structure. SC-FDMA can be used, for instance, in uplink communications where lower PAPR greatly benefits UEs in terms of transmit power efficiency. Accordingly, SC-FDMA can be implemented as an uplink multiple access scheme in 3GPP Long Term Evolution (LTE) or Evolved UTRA.

Furthermore, various embodiments are described herein in connection with UEs. A UE can also be called a system, subscriber unit, subscriber station, mobile station, mobile, remote station, remote terminal, mobile device, access terminal, wireless communication device, user agent or user device. A UE can be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem. Moreover, various embodiments are described herein in connection with a BS or access node (AN). A BS can be utilized for communicating with UEs and can also be referred to as an access point, BS, Femto node, Pico Node, Node B, Evolved Node B (eNodeB, eNB) or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include, but are not limited to, magnetic storage devices (e.g., hard disk, floppy disk, magnetic strips), optical disks (e.g., compact disk (CD), digital versatile disk (DVD)), smart cards, and flash memory devices (e.g., EPROM, card, stick, key drive). Additionally, various storage media described herein can represent one or more devices and/or other machine-readable media for storing information. The term "machine-readable medium" can include, without being limited to, wireless channels and various other media (and/or storage media) capable of storing, containing, and/or carrying codes and/or instruction(s) and/or data.

In some aspects the teachings herein may be employed in a network that includes macro scale coverage (e.g., a large area cellular network such as a 3G networks, typically referred to as a macro cell network) and smaller scale coverage (e.g., a residence-based or building-based network environment). A UE moves through such a network. The UE may be served in certain locations by BSs that provide macro coverage while the UE may be served at other locations by BSs that provide smaller scale coverage. In some aspects, the smaller coverage nodes may be used to provide incremental capacity growth, in-building coverage, and different services (e.g., for a more robust user experience). In the discussion herein, a node that provides coverage over a relatively large area may be referred to as a Macro node. A node that provides coverage over a relatively small area (e.g., a residence) may be referred to as a Femto node. A node that provides coverage over an area that is smaller than a macro area and larger than a Femto area may be referred to as a Pico node (e.g., providing coverage within a commercial building).

A cell associated with a Macro node, a Femto node, or a Pico node may be referred to as a macro cell, a Femto cell, or a Pico cell, respectively. In some implementations, each cell may be further associated with (e.g., divided into) one or more sectors.

In various applications, other terminology may be used to reference a Macro node, a Femto node, or a Pico node. For example, a Macro node may be configured or referred to as a BS, access point, eNodeB, macro cell, and so on. Also, a Femto node may be configured or referred to as a Home NodeB, Home eNodeB, access point access node, a BS, a Femto cell, and so on.

FIG. 1 is an illustration of an example wireless communication system facilitating frequency reuse for DL control channels in accordance with various aspects set forth herein. In wireless communication system 100, interference caused by transmissions on the UL can be managed by the BS 102 while interference caused by transmissions on the DL can be managed by the UEs 116, 122.

Referring now to FIG. 1, a wireless communication system 100 is illustrated in accordance with various embodiments presented herein. System 100 includes a BS 102 that can include multiple antenna groups. For example, one antenna group can include antennas 104, 106, another group can comprise antennas 108, 110, and an additional group can include antennas 112, 114. Two antennas are illustrated for each antenna group; however, more or fewer antennas can be utilized for each group. BS 102 can additionally include a transmitting node chain and a receiving node chain, each of which can in turn comprise a plurality of components associated with signal transmission and reception (e.g., processors, modulators, multiplexers, demodulators, demultiplexers, antennas), as will be appreciated by one skilled in the art.

BS 102 can communicate with one or more UEs such as UE 116, 122. However, it is to be appreciated that BS 102 can communicate with substantially any number of UEs similar to UEs 116, 122. UEs 116, 122 can be, for example, cellular phones, smart phones, laptops, handheld communication devices, handheld computing devices, satellite radios, global positioning systems, PDAs, and/or any other suitable device for communicating over wireless communication system 100. As depicted, UE 116 is in communication with antennas 112, 114, where antennas 112, 114 transmit information to UE 116 over DL 118 and receive information from UE 116 over a UL 120. Moreover, UE 122 is in communication with antennas 104, 106, where antennas 104, 106 transmit information to UE 122 over a DL 124 and receive information from UE 122 over a UL 126. In a frequency division duplex (FDD) system, DL 118 can utilize a different frequency band than that used by UL 120, and DL 124 can employ a different frequency band than that employed by UL 126, for example. Further, in a time division duplex (TDD) system, DL 118 and UL 120 can utilize a common frequency band and DL 124 and UL 126 can utilize a common frequency band.

Each group of antennas and/or the area in which they are designated to communicate can be referred to as a sector of BS 102. For example, antenna groups can be designed to communicate to UEs in a sector of the areas covered by BS 102. In communication over DLs 118, 124, the transmitting antennas of BS 102 can utilize beamforming to improve signal-to-noise ratio of DLs 118, 124 for UEs 116, 122. Also, while BS 102 utilizes beamforming to transmit to UEs 116, 122 scattered randomly through an associated coverage, UEs 116, 122 in neighboring cells can be subject to less interference as compared to a BS transmitting through a single antenna to all its UEs. Further, the BS 102 and UEs 116, 122 can be configured providing configuration of scheduling policy for facilitating distributed scheduling as described herein.

Figure 2A:
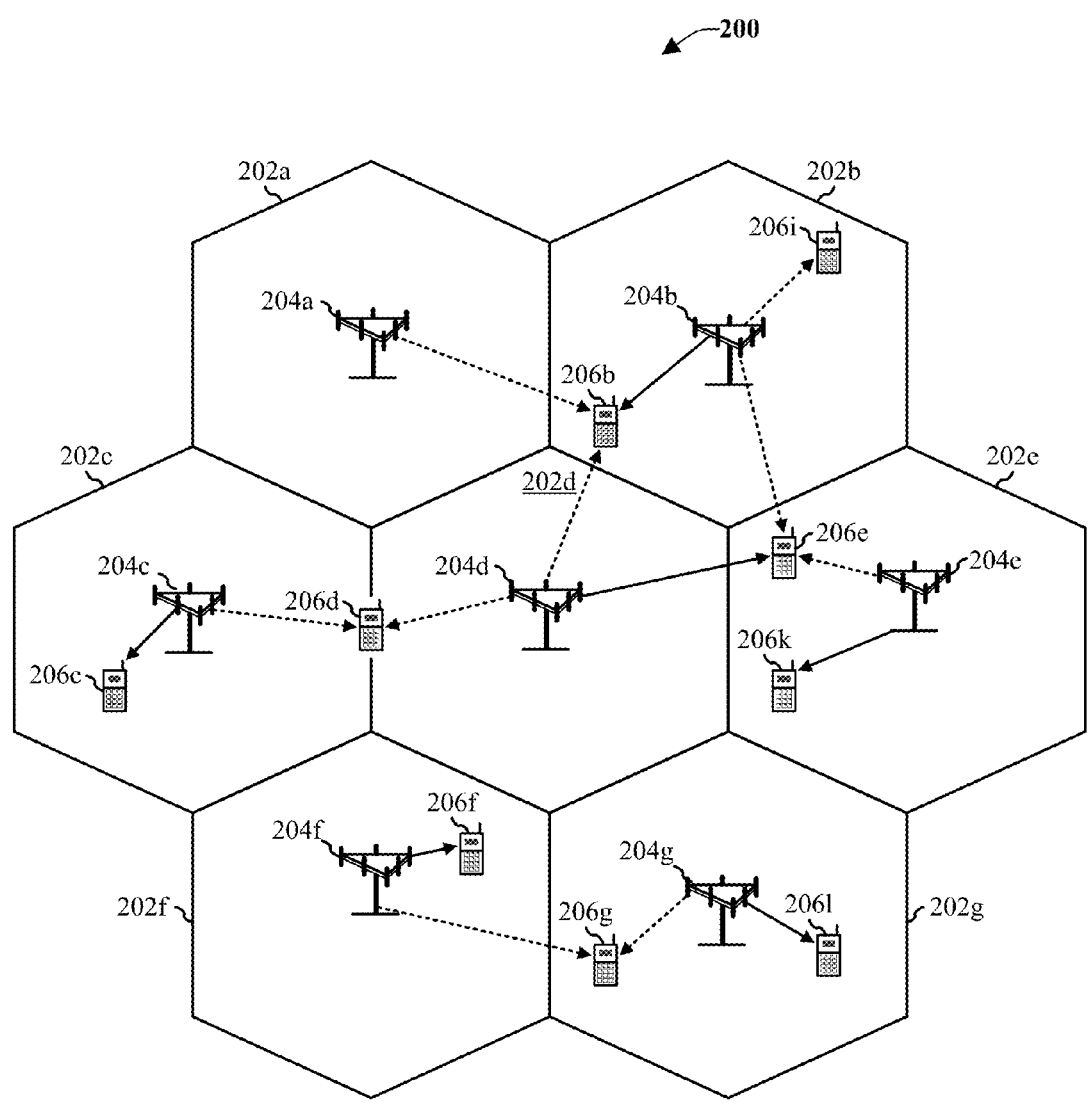
FIG. 2A is an illustration of another example wireless communication system facilitating frequency reuse for DL control channels.

FIG. 2A is an illustration of another example wireless communication system facilitating frequency reuse for DL control channels in accordance with various aspects set forth herein. The system 200 provides communication for multiple cells 202, such as, for example, macro cells 202A-202G, with each cell being serviced by a corresponding BS 204 (e.g., BS 204A-204G). As shown in FIG. 2, UE 206 (e.g., UEs 206A-206L) can be dispersed at various locations throughout the system over time. Each UE 206 can communicate with one or more BS 204 on a DL or a UL at a given moment, depending upon whether the UE 206 is active and whether it is in soft handoff, for example. The wireless communication system 200 may provide service over a large geographic region. For example, macro cells 202A-202G may cover a few blocks in a neighborhood.

Figure 2B:
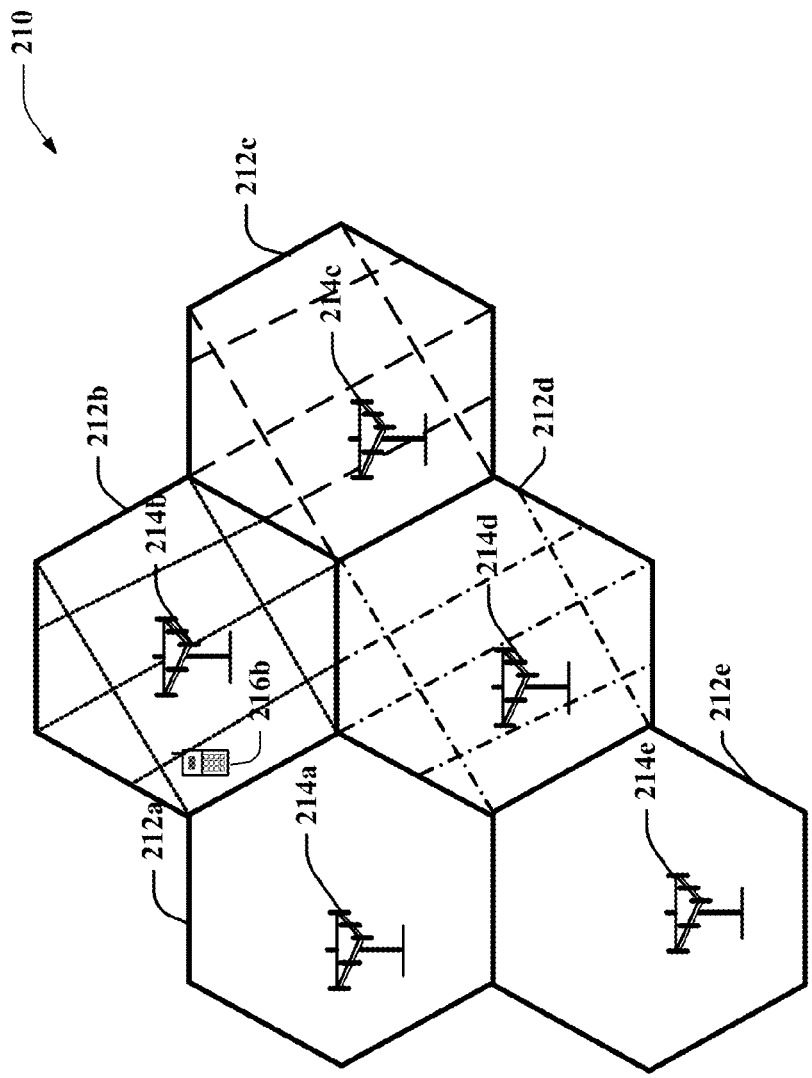
FIG. 2B is an illustration of another example wireless communication system facilitating frequency reuse for DL control channels.

FIG. 2B is an illustration of another example wireless communication system facilitating frequency reuse for DL control channels in accordance with various aspects set forth herein. The wireless communication system 210 can be an LTE system in some embodiments, although any other suitable type of wireless communication system can be employed.

The wireless communication system 210 can be divided into a plurality of cells 212a, 212b, 212c, 212d, 212e. Each of the plurality of cells 212a, 212b, 212c, 212d, 212e can be served by a BS. For example, each of the plurality of cells 212a, 212b, 212c, 212d, 212e can be respectively served by BSs 214a, 214b, 214c, 214d, 214e. UE 216b can be served by BS 214a. As such BS 214a, for example, can provide control information to UE 216b over a PDCCH. The frequency reuse schemes described herein can be employed within the system 210.

Figure 3:
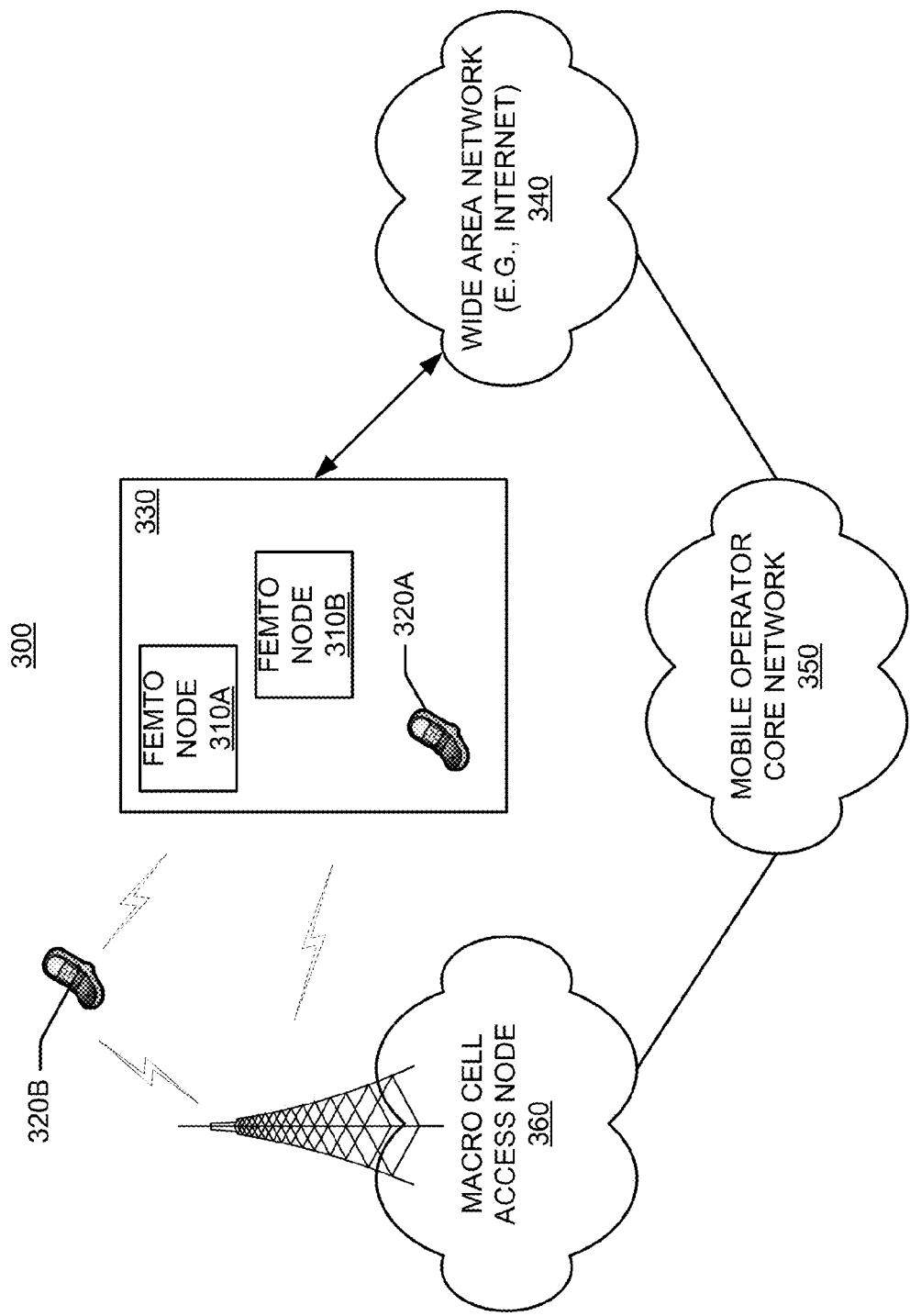
FIG. 3 is an illustration of an example wireless communication system where one or more Femto nodes are deployed for facilitating frequency reuse for DL control channels.

FIG. 3 is an illustration of an example wireless communication system where one or more Femto nodes are deployed for facilitating frequency reuse for DL control channels in accordance with various aspects set forth herein. Specifically, the system 300 includes multiple Femto nodes 310 (e.g., Femto nodes 310A and 310B) installed in a relatively small scale network environment (e.g., in one or more user residences 330). Each Femto node 310 can be coupled to a wide area network 340 (e.g., the Internet) and a mobile operator core network 350 via a DSL router, a cable modem, a wireless link, or other connectivity means (not shown). As will be discussed below, each Femto node 310 can be configured to serve associated UEs (e.g., associated UE 320A) and, optionally, alien UEs (e.g., alien UE 320B). In other words, access to Femto nodes 310 may be restricted whereby a given UE 320 can be served by a set of designated (e.g., home) Femto node(s) 310 but may not be served by any non-designated Femto nodes 310 (e.g., a neighbor's Femto node 310).

However, in various embodiments, an associated UE 320A can experience interference on the DL from a Femto node 310 serving an alien UE 320B. Similarly, a Femto node 310 associated with associated UE 320A can experience interference on the UL from the alien UE 320B. In embodiments, interference management can be facilitated in the system 300 as described herein.

Figure 4:
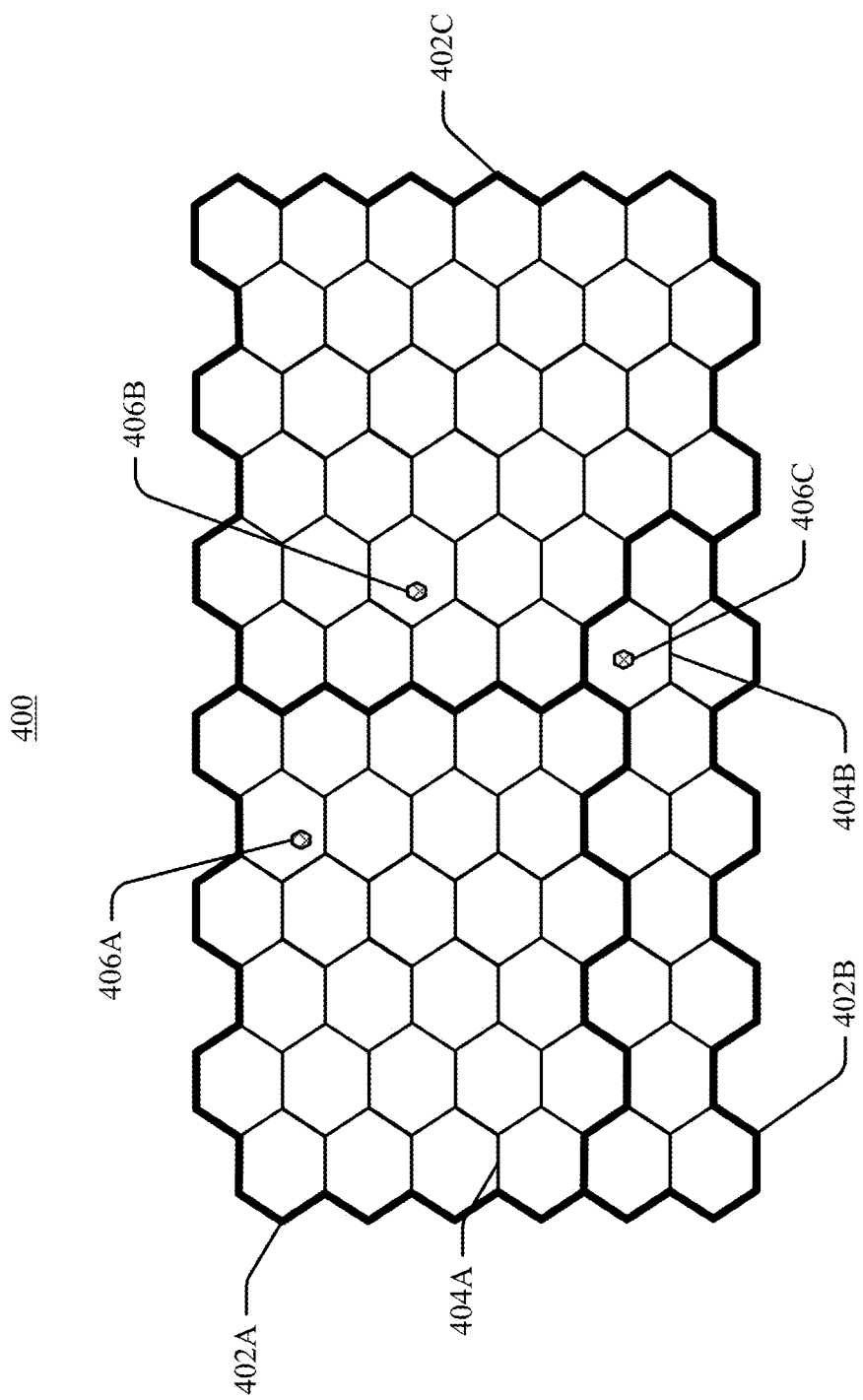
FIG. 4 is an illustration of an example coverage map in a wireless communication system for facilitating frequency reuse for DL control channels.

FIG. 4 is an illustration of an example coverage map in a wireless communication system for facilitating frequency reuse for DL control channels in accordance with various aspects set forth herein. The coverage map 400 can include several tracking areas 402 (or routing areas or location areas), each of which can include several macro coverage areas. In the embodiment shown, areas of coverage associated with tracking areas 402A, 402B, and 402C are delineated by the wide lines and the macro coverage areas 404 are represented by the hexagons. The tracking areas 402A, 402B, and 402C can include Femto coverage areas 406. In this example, each of the Femto coverage areas 406 (e.g., Femto coverage area 406C) is depicted within a macro coverage area 404 (e.g., macro coverage area 404B). It should be appreciated, however, that a Femto coverage area 406 may not lie entirely within a macro coverage area 404. In practice, a large number of Femto coverage areas 406 can be defined with a given tracking area 402 or macro coverage area 404. Also, one or more Pico coverage areas (not shown) can be defined within a given tracking area 402 or macro coverage area 404.

Referring again to FIG. 3, the owner of a Femto node 310 can subscribe to mobile service, such as, for example, 3G mobile service, offered through the mobile operator core network 350. In addition, a UE 320 may be capable of operating both in macro environments and in smaller scale (e.g., residential) network environments. In other words, depending on the current location of the UE 320, the UE 320 may be served by an access node 360 of the mobile operator core network 350 or by any one of a set of Femto nodes 310 (e.g., the Femto nodes 310A and 310B that reside within a corresponding user residence 330). For example, when a subscriber is outside his home, he is served by a standard macro access node (e.g., node 360) and when the subscriber is at home, he is served by a Femto node (e.g., node 310A). Here, it should be appreciated that a Femto node 310 may be backward compatible with existing UEs 320.

A Femto node 310 may be deployed on a single frequency or, in the alternative, on multiple frequencies. Depending on the particular configuration, the single frequency or one or more of the multiple frequencies can overlap with one or more frequencies used by a Macro node (e.g., node 360).

In some aspects, a UE 320 can be configured to connect to a preferred Femto node (e.g., the home Femto node of the UE 320) whenever such connectivity is possible. For example, whenever the UE 320 is within the user residence 330, it may be desired that the UE 320 communicate only with the home Femto node 310.

In some aspects, if the UE 320 operates within the mobile operator core network 350 but is not residing on its most preferred network (e.g., as defined in a preferred roaming list), the UE 320 may continue to search for the most preferred network (e.g., the preferred Femto node 310) using a Better System Reselection (BSR), which can involve a periodic scanning of available systems to determine whether better systems are currently available, and subsequent efforts to associate with such preferred systems. With the acquisition entry, the UE 320 may limit the search for specific band and channel. For example, the search for the most preferred system may be repeated periodically. Upon discovery of a preferred Femto node 310, the UE 320 selects the Femto node 310 for camping within its coverage area.

A Femto node may be restricted in some aspects. For example, a given Femto node may only provide certain services to certain UEs. In deployments with so-called restricted (or closed) association, a given UE may only be served by the macro cell mobile network and a defined set of Femto nodes (e.g., the Femto nodes 310 that reside within the corresponding user residence 330). In some implementations, a node may be restricted to not provide, for at least one node, at least one of: signaling, data access, registration, paging, or service.

In some aspects, a restricted Femto node (which may also be referred to as a Closed Subscriber Group Home NodeB) is one that provides service to a restricted provisioned set of UEs. This set may be temporarily or permanently extended as necessary. In some aspects, a Closed Subscriber Group (CSG) may be defined as the set of BSs (e.g., Femto nodes) that share a common access control list of UEs. A channel on which all Femto nodes (or all restricted Femto nodes) in a region operate may be referred to as a Femto channel.

Various relationships may thus exist between a given Femto node and a given UE. For example, from the perspective of a UE, an open Femto node may refer to a Femto node with no restricted association. A restricted Femto node may refer to a Femto node that is restricted in some manner (e.g., restricted for association and/or registration). A home Femto node may refer to a Femto node on which the UE is authorized to access and operate on. A guest Femto node may refer to a Femto node on which a UE is temporarily authorized to access or operate on. An alien Femto node may refer to a Femto node on which the UE is not authorized to access or operate on, except for perhaps emergency situations (e.g., 911 calls).

From a restricted Femto node perspective, a home UE may refer to a UE that authorized to access the restricted Femto node. A guest UE may refer to a UE with temporary access to the restricted Femto node. An alien UE may refer to a UE that does not have permission to access the restricted Femto node, except for perhaps emergency situations, for example, such as 911 calls (e.g., a UE that does not have the credentials or permission to register with the restricted Femto node).

While the description of FIG. 4 has been provided with reference to a Femto node, it should be appreciated, that a Pico node may provide the same or similar functionality for a larger coverage area. For example, a Pico node may be restricted, a home Pico node may be defined for a given UE, and so on.

A wireless multiple-access communication system can simultaneously support communication for multiple wireless UEs. As mentioned above, each UE can communicate with one or more BSs via transmissions on the DL or the UL. These communication links (i.e., DL and UL) may be established via a single-in-single-out system, a multiple-in-multiple-out (MIMO) system, or some other type of system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system may provide improved performance (e.g., higher throughput and/or greater reliability) if the additional dimensionalities created by the multiple transmit and receive antennas are utilized.

A MIMO system can support TDD and FDD. In a TDD system, the DL and UL transmissions can be on the same frequency region so that the reciprocity principle allows the estimation of the DL channel from the UL. This enables the BS to transmit beam-forming gain on the DL when multiple antennas are available at the BS. In some embodiments, the channel conditions of the UL channel can be estimated from the DL channel, for interference management, as described herein.

Figure 5:
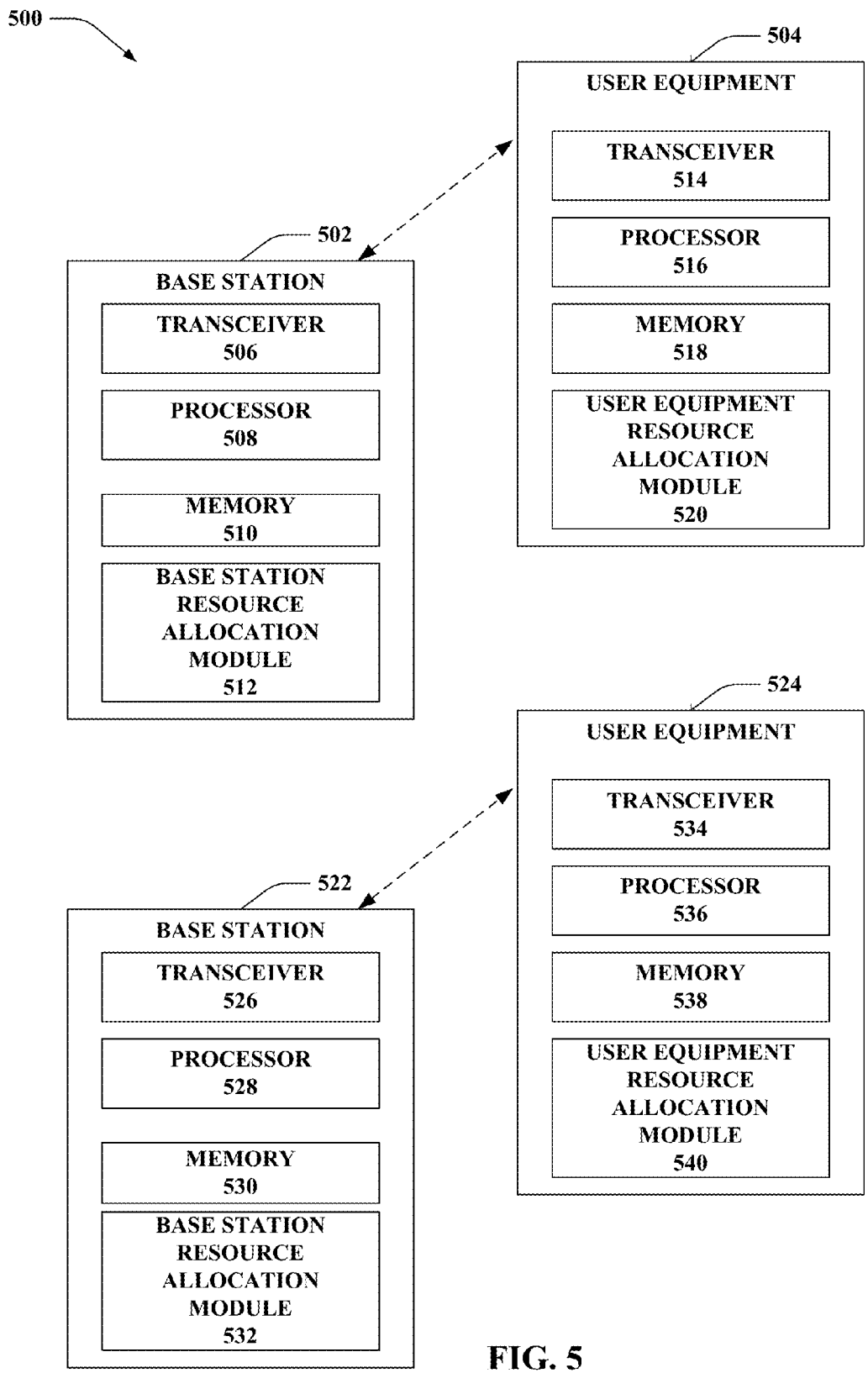
FIG. 5 is an illustration of an example block diagram of a wireless communication system for facilitating frequency reuse for DL control channels in accordance with various aspects set forth herein.

FIG. 5 is an illustration of an example block diagram of a wireless communication system for facilitating frequency reuse for DL control channels in accordance with various aspects set forth herein.

The wireless communication system 500 can include BSs 502, 522 and UEs 504, 524 served by BS 502, 522, respectively. BSs 502, 522 can be located in different cells. The wireless communication system 500 can be an LTE system in some embodiments.

BSs 502, 522 can include transceivers 506, 516 configured to transmit and receive data and/or control information and/or any other type of information described herein with reference to any of the systems, methods, apparatus and/or computer program products to and from UEs 504, 524, respectively. Transceivers 506, 516 can be configured to receive data and control channels. Additionally, the transceivers 506, 516 can be configured to transmit and receive OFDM symbols.

BSs 502, 522 can also include processors 508, 528 and memory 510, 530. Processors 508, 528 can be configured to perform one or more of the functions described herein with reference to any of the systems, methods, apparatus and/or computer program products. The BSs 502, 522 can include memory 510, 530, respectively. The memory 510, 530 can be for storing computer-executable instructions and/or information for performing the functions described herein with reference to any of the systems, methods, apparatus and/or computer program products.

BSs 502, 522 can also include BS resource allocation modules 512, 532 configured to allocate resources including, but not limited to, bandwidth, for achieving frequency reuse on DL control channels. For example, in one embodiment, the BS resource allocation modules 512, 532 can allocate resources for achieving frequency reuse on PDCCH using OFDM transmission schemes as discussed in more detail below.

The wireless communication system 500 can also include UEs 504, 524 served by BSs 502, 522, respectively, and located in corresponding cells managed by BSs 502, 522.

UEs 504, 524 can include transceivers 514, 534 configured to transmit and receive data and/or control information and/or any other type of information described herein with reference to any of the systems, methods, apparatus and/or computer program products to and from BSs 502, 522, respectively. Transceivers 514, 534 can be configured to receive data and control channels. Additionally, the transceivers 514, 534 can be configured to transmit and receive OFDM symbols.

UEs 504, 524 can also include processors 516, 536 and memory 518, 538. Processors 516, 536 can be configured to perform one or more of the functions described herein with reference to any of the systems, methods, apparatus and/or computer program products. The UEs 504, 524 can include memory 518, 538 respectively. The memory 518, 538 can be for storing computer-executable instructions and/or information for performing the functions described herein with reference to any of the systems, methods, apparatus and/or computer program products.

UEs 504, 524 can also include UE resource allocation modules 520, 540 configured to receive and process resource allocation information for achieving frequency reuse for DL control channels in wireless communication system 500. UE resource allocation modules 520, 540 can also be configured to process data and/or control information according to the resource allocations received from the BSs 502, 522, respectively.

In conventional systems, such as the LTE Release 8 systems, a Physical Control Format Indicator Channel (PCFICH) and a Physical Downlink Control Channel (PDCCH) are typical DL control channels provided. In these embodiments, the PCFICH is in the first symbol transmitted by a BS to a UE. The PCFICH can provide information to the UE regarding the number of OFDM symbols used for the PDCCH in a subframe. In various embodiments, the PCFICH can provide for one, two or three OFDM symbols for the PDCCH for larger system bandwidths (e.g., greater than 10 resource blocks (RBs)). The PCFICH can provide for two, three or four OFDM symbols for the PDCCH for smaller system bandwidths (e.g., less than or equal to 10 RBs).

Referring back to FIG. 5, in some embodiments, the resource allocation modules 512, 532 can configure a number of OFDM symbols for PDCCH in a subframe to provide frequency reuse on the DL control channel. By contrast, in conventional systems, the configuration of multiple control symbols is typically employed for the purpose of increasing PDCCH capacity. Referring back to FIG. 5, after the BS 502 transmits the first symbol to the UE 504, a number of subsequent OFDM symbols can be transmitted by the 502 to the UE 504. For example, the subsequent OFDM symbols can be transmitted to increase the likelihood that the UE will properly receive the control information transmitted. This control information is distributed in the frequency domain and therefore provides frequency diversity with a minimum unit of 4 Resource Elements (REs) or 1 Resource Element Group (REG). As used herein, a REG is the minimum construction unit for all control channels (e.g., PCFICH, physical hybrid automatic repeat request indicator channel (PHICH), PDCCH). However, for PDCCH, the minimum unit is further defined by the control channel element (CCE) wherein each CCE includes 9 REGs or 36 REs. If the number of OFDM symbols transmitted on the PDCCH is greater than 1, control information can be spread over multiple OFDM symbols to also provide time diversity. However, the frequency-distributed nature of DL control transmission makes it difficult to achieve an FDM-type reuse.

In the embodiments described herein, the resource allocation modules 512, 532 for BSs 502, 522 can be configured to facilitate a null-PDCCH based approach for providing frequency reuse on DL channels.

In these embodiments, the resource allocation modules 512, 532 can overbook the number of OFDM symbols associated with the PDCCH. The amount by which the overbooking can be provided can be based, at least, on the size of the bandwidth of and/or channel conditions within wireless communication system 500. As used herein, the term "overbooking" can mean that a number of PDCCHs made available is larger than the number of PDCCH required. For example, in various embodiments, the resource allocation module 512 can assign three OFDM symbols for the PDCCH for symbol bandwidths greater than 10 RBs, and assign four OFDM symbols for the PDCCH for other symbol bandwidths.

In some embodiments, the number of PDCCHs available in a subframe can increase with the number of OFDM symbols configured.

The number of PDCCHs required can depend on scheduling decisions from the DL scheduler, UL scheduler in some embodiments. In other embodiments, the number of PDCCHs required can depend on scheduling decisions from the DL scheduler, UL scheduler and other functions including, but not limited to, group power control and/or paging. For example, if, at a first subframe, one OFDM symbol is sufficient to support DL and UL PDCCH transmissions, but three OFDM symbols are configured (instead of configuring only one OFDM symbol), an effective reuse factor of 1/3 or less can be achieved. A scheduler can choose to schedule DL and/or UL traffic in a consolidated manner such that the majority of the time, only a subset of subframes are most used, while another subject of subframes are least used. By doing so, some of the subframes only need one control symbol (or even less than one symbol) to be created. The effective reuse factor by overbooking can vary depending on the system load across the cells in the wireless communication system. For example, the effective reuse factor can lie within at least 1/3 to 1/1.

The aforementioned overbooking approach to frequency reuse can be provided for synchronous networks. In various embodiments, the overbooking can reduce the number of OFDM symbols for PDSCH (and therefore the throughput for PDSCH). The LTE Release 8 can be utilized with no change to the LTE Release 8 standard. The embodiment can be employed in a system with a synchronous network.

Figure 6:
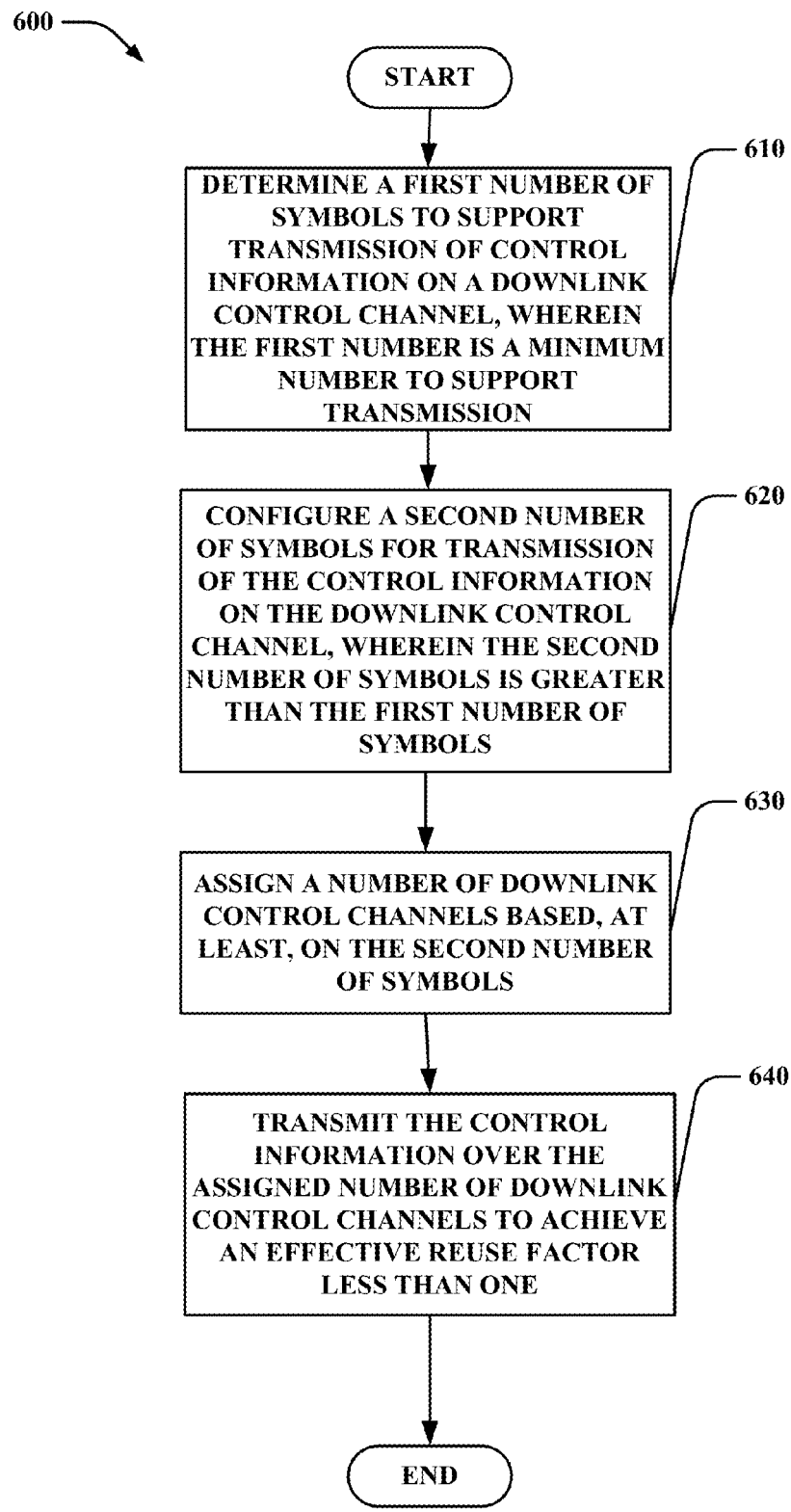
FIG. 6 is an illustration of an example of a flowchart of a method for facilitating frequency reuse for DL control channels in accordance with various aspects set forth herein.

FIG. 6 is a flowchart of a method for facilitating frequency reuse on a DL control channel. In some embodiments, the method 600 can be performed in an LTE wireless communication system, including but not limited to, a release 8 system.

At 610, method 600 can include determining a first number of symbols to support transmission of control information on a downlink control channel. The first number of symbols to support transmission of control information on a downlink control channel can be a minimum number of symbols available for supporting transmission. The symbols can be OFDM symbols and the downlink control channel can be a PDCCH in various embodiments.

At 620, method 600 can include configuring a second number of symbols for transmission of control information on the downlink control channel. In some embodiments, the second number of symbols for transmission of control information on the downlink control channel is greater than the first number of symbols.

At 630, method 600 can include assigning a number of downlink control channels based, at least, on the second number of symbols for transmission of control information on the downlink control channel. In some embodiments, the number of downlink control channels based, at least, on the second number of symbols is increased relative to a number of downlink control channels corresponding to the first number of symbols.

At 640, method 600 can include transmitting control information over an assigned number of downlink control channels to achieve an effective reuse factor less than one.

In some embodiments, the second number of symbols for transmission of control information on the downlink control channel is based, at least, on a system bandwidth or subframe types of the wireless communication system, and/or channel conditions in the wireless communication system. As an example regarding system bandwidth, the second number of symbols for transmission of control information on the downlink control channel can be three symbols if the system bandwidth of the wireless communication system is greater than 10 RBs. As an example regarding subframe types, for some subframes (e.g., multimedia broadcast over a single frequency network (MBSFN), or special subframes in a TDD system) up to two OFDM symbols can be configured instead of three OFDM symbols.

In some embodiments, the effective reuse factor is no more than the first number of symbols to support transmission of control information on a downlink control channel divided by the second number of symbols for transmission of control information on the downlink control channel. In various embodiments, however, the effective frequency reuse factor can be increased due to the system load or decreased based, at least, on system load and/or scheduling choices.

Another approach to achieving frequency reuse on DL control channels can be based, at least, on limiting a select number of available REGs per cell in the wireless communication system.

Referring back to FIG. 5, the resource allocation modules 512, 532 can be configured to facilitate frequency reuse by limiting the number of available REGs per cell. The LTE Release 8 standard can be modified to redefine the availability of REGs per cell such that the number can be limited, and frequency reuse can be achieved.

In conventional systems, the approach for defining REGs is to assume that the entire DL system bandwidth of the wireless communication system will be used. The REG is the minimum resource mapping unit for the PCFICH, PDCCH and the PHICH. As described above, for PDCCH, the minimum unit is further defined by the CCE wherein each CCE includes 9 REGs or 36 REs. As such, in these embodiments, the PDCCH relies on 9 REGs or 1 CCE as the minimum unit. Using this approach, a PDCCH for a cell is spread over the entire system bandwidth.

To the contrary, in embodiments described herein, only a fraction of the system bandwidth can be assumed for use by limiting the number of available REGs per cell. As such, instead of making all REGs available to a given cell, the REGs can be defined only to include only a fraction of system bandwidth, and the definition of the limitation on the REGs can be coordinated across neighboring cells. For example, the use of REGs can be limited across neighboring cells such that FDM-type reuse can be achieved.

The result is that the PDCCH, PCFICH and/or PHICH, for a cell can be limited to the designated fraction of the bandwidth. In this manner, neighboring cells can use different fractions of the bandwidth, which can enable FDM-type reuse and resultant increased reliability of PDCCH transmission. With reference to FIG. 2B, REGs can be defined for cells 212*b*, 212*c*, 212*d* for different fractions of bandwidth.

This embodiment can be simple to implement and have little to no significant impact on PDSCH throughput (as with the embodiment described with reference to method 600). The embodiment can be employed in LTE Release 8 systems by modifying the standard to allow defining or re-defining the availability of REGs per cell. The embodiment can be employed in a system with a synchronous network.

Figure 7A:
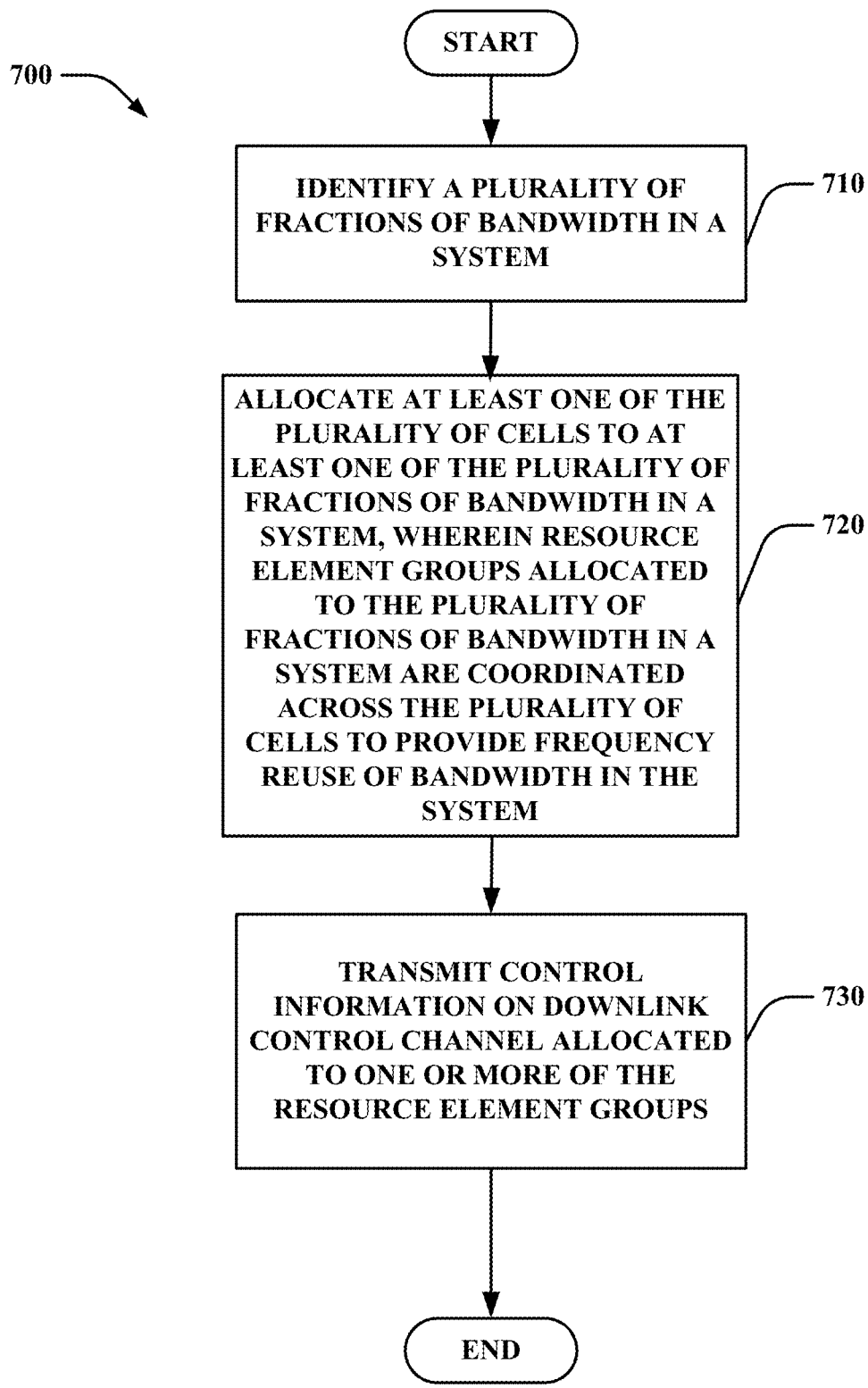
FIG. 7A is an illustration of an example of a flowchart of a method for facilitating frequency reuse for DL control channels in accordance with various aspects set forth herein.

FIG. 7A is a flowchart of a method for facilitating frequency reuse on a DL control channel. In some embodiments, the method 600 can be performed in an LTE wireless communication system modified to enable re-definition of REGs.

At 710, method 700 can include identifying a plurality of fractions of bandwidth in a system. The system can include a plurality of cells.

At 720, method 700 can include allocating at least one of the plurality of cells to at least one of the plurality of fractions of bandwidth in a system. In some embodiments, the REGs allocated to the plurality of fractions of bandwidth in a system are coordinated across the plurality of cells to provide frequency reuse of bandwidth in the system.

At 730, method 700 can include transmitting control information on a downlink control channel allocated to one or more of the REGs. The downlink control channel can be a PDCCH, a PFICH, and/or a PHICH in various embodiments. In some embodiments, the PDCCH can be allocated to at least nine of the one or more of the REGs, the PCFICH can be allocated to at least four of the one or more of the REGs and/or the PHICH can be allocated to at least three of the one or more of the REGs.

Figure 8:
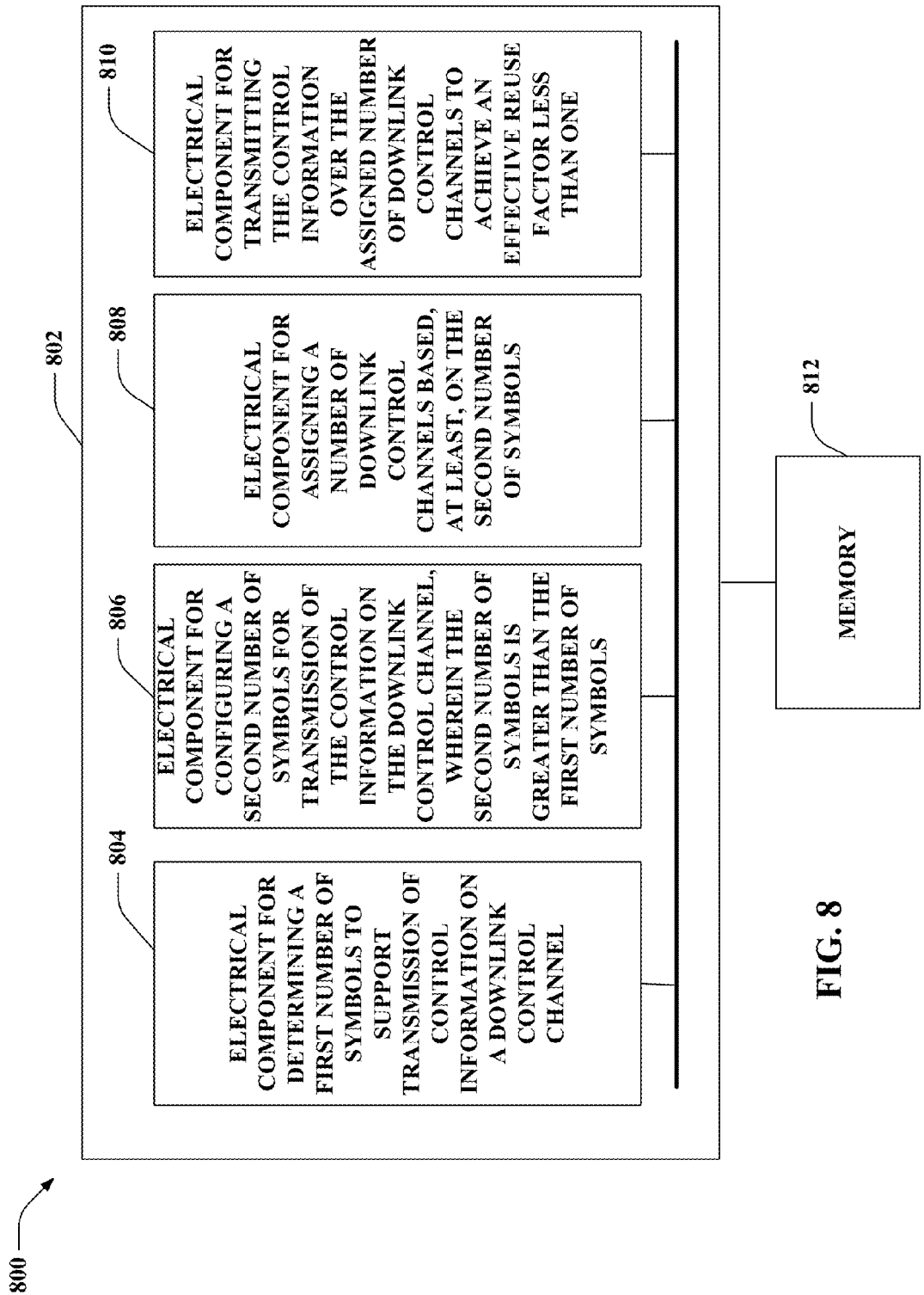
FIGS. 8, 9 and 10 are illustrations of block diagrams of example systems for facilitating frequency reuse for DL control channels in accordance with various aspects set forth herein.

FIG. 8 is an illustration of a block diagram of an example system of facilitating frequency reuse on DL control channels in accordance with various aspects set forth herein. It is to be appreciated that system 800 is represented as including functional blocks, which can be functional blocks that represent functions implemented by a processor, hardware, software, firmware, or combination thereof. In some embodiments, the system 800 can be performed in an LTE wireless communication system, including but not limited to, a release 8 system.

Figure 7B:
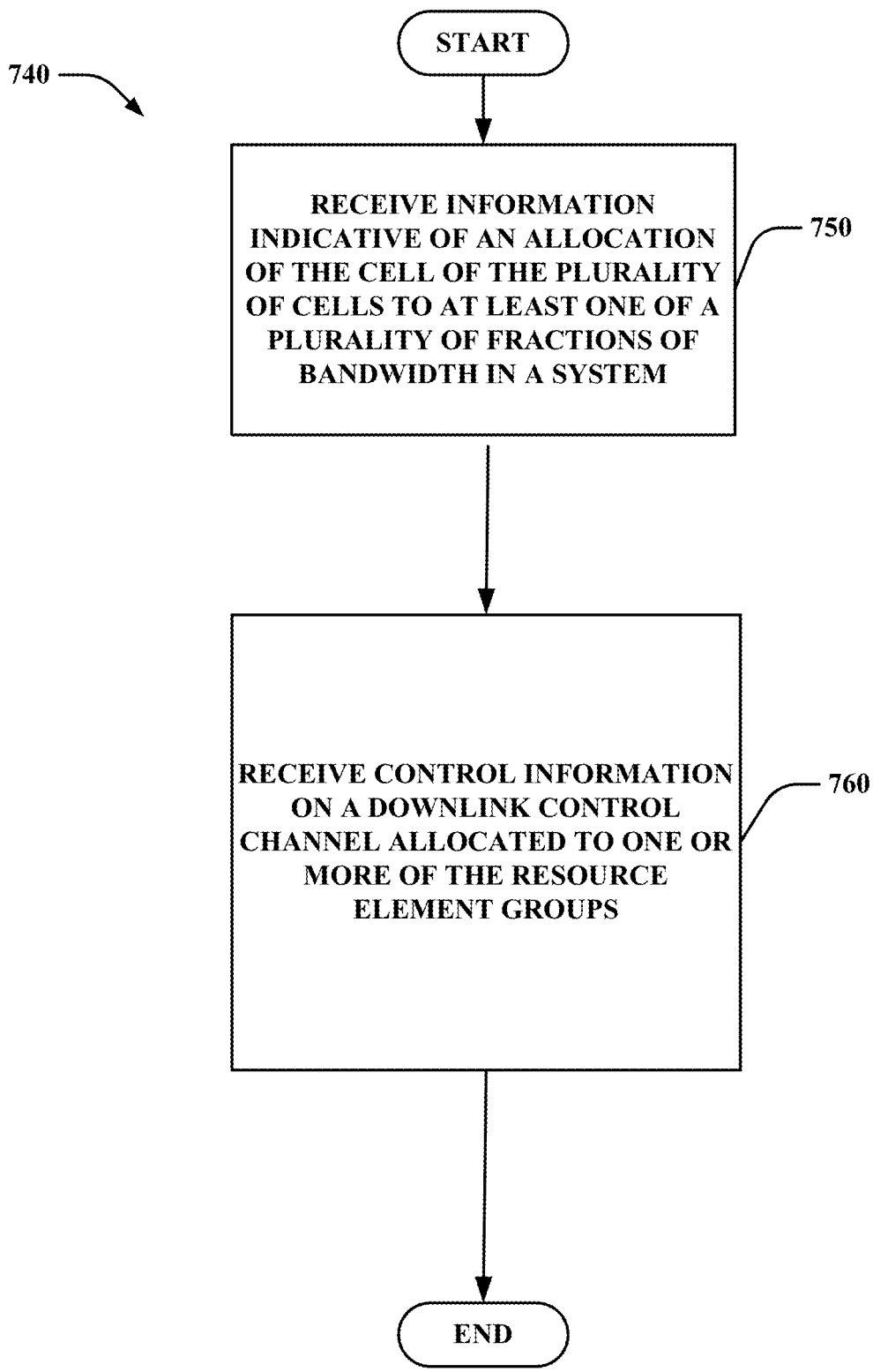
FIG. 7B is an illustration of another example of a flowchart of a method for facilitating frequency reuse for DL control channels in accordance with various aspects set forth herein.

FIG. 7B is a flowchart of another method for facilitating frequency reuse on a DL control channel. In some embodiments, the method 600 can be performed in an LTE wireless communication system modified to enable re-definition of REGs.

In some embodiments, at 750, method 740 can include receiving, by UE in a cell of a plurality of cells, information indicative of an allocation of the cell of the plurality of cells to at least one of a plurality of fractions of bandwidth in a system. REGs allocated to the plurality of fractions of bandwidth in a system can be coordinated across the plurality of cells to provide frequency reuse of bandwidth in the system.

At 760, method 750 can include receiving control information on a DL control channel allocated to one or more of the REGs.

In some embodiments, the DL control channel is at least one of a PDCCH, a PCFICH or a PHICH.

In some embodiments, the PDCCH is allocated to at least nine of the one or more of the REGs, wherein the PHICH is allocated to at least four of the one or more of the REGs or wherein the PHICH is allocated to at least three of the one or more of the REGs.

System 800 can include a logical or physical grouping 802 of electrical components. For example, logical or physical grouping 802 can include an electrical component 804 for determining a first number of symbols to support transmission of control information on a downlink control channel. The first number of symbols to support transmission of control information on a downlink control channel can be a minimum number of symbols available for supporting transmission. The symbols can be OFDM symbols and the downlink control channel can be a PDCCH in various embodiments.

Logical or physical grouping 802 can include an electrical component 806 for configuring a second number of symbols for transmission of control information on the downlink control channel. In some embodiments, the second number of symbols for transmission of control information on the downlink control channel is greater than the first number of symbols.

Logical or physical grouping 802 can include an electrical component 808 for assigning a number of downlink control channels based, at least, on the second number of symbols for transmission of control information on the downlink control channel. In some embodiments, the number of downlink control channels based, at least, on the second number of symbols is increased relative to a number of downlink control channels corresponding to the first number of symbols.

Logical or physical grouping 802 can include an electrical component 810 for transmitting control information over an assigned number of downlink control channels to achieve an effective reuse factor less than one.

In some embodiments, the second number of symbols for transmission of control information on the downlink control channel is based, at least, on a system bandwidth and/or subframe type of the wireless communication system and/or channel conditions in the wireless communication system. For example, the second number of symbols for transmission of control information on the downlink control channel can be three symbols if the system bandwidth of the wireless communication system is greater than 10 RBs.

In some embodiments, the effective reuse factor is no more than the first number of symbols to support transmission of control information on a downlink control channel divided by the second number of symbols for transmission of control information on the downlink control channel. In various embodiments, however, the effective frequency reuse factor can be increased due to the system load or decreased based, at least, on system load and/or scheduling choices.

The logical or physical grouping 802 can also include an electrical component 812 for storing. The electrical component 812 for storing can be configured to store symbol assignment, PDCCH, system bandwidth, and/or channel condition information.

Figure 9:
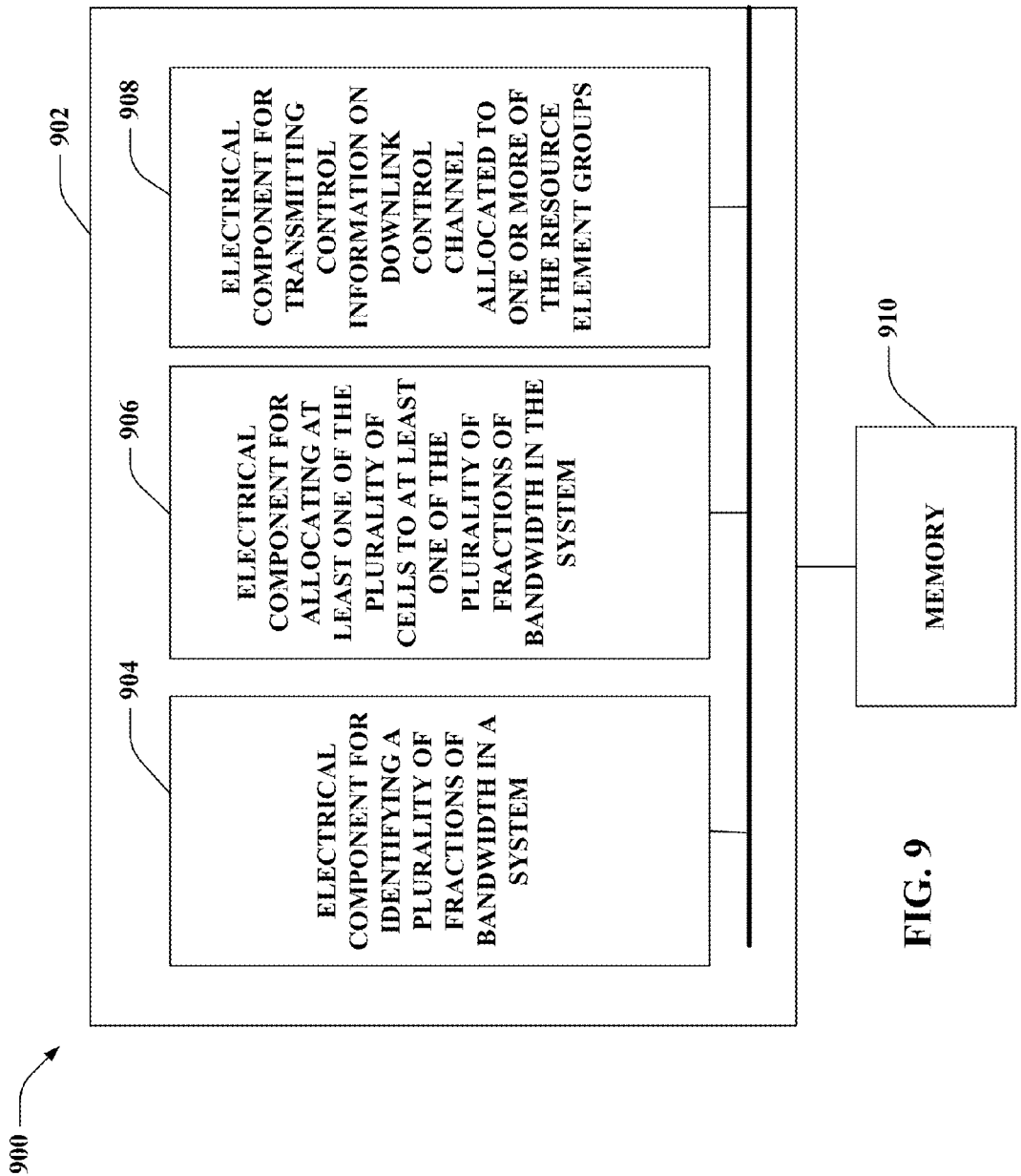

FIG. 9 is an illustration of a block diagram of an example system facilitating frequency reuse in DL control channels in accordance with various aspects set forth herein. It is to be appreciated that system 900 is represented as including functional blocks, which can be functional blocks that represent functions implemented by a processor, hardware, software, firmware, or combination thereof. System 900 can include a logical or physical grouping 902 of electrical components for facilitating the frequency reuse.

The electrical components can act in conjunction. For instance, the logical or physical grouping 902 can include an electrical component 904 for identifying a plurality of fractions of bandwidth in a system. The system can include a plurality of cells.

The logical or physical grouping 902 can also include an electrical component 906 for allocating at least one of the plurality of cells to at least one of the plurality of fractions of bandwidth in a system. In some embodiments, the REGs allocated to the plurality of fractions of bandwidth in a system are coordinated across the plurality of cells to provide frequency reuse of bandwidth in the system.

The logical or physical grouping 902 can include an electrical component 908 for transmitting control information on a downlink control channel allocated to one or more of the REGs. The downlink control channel can be a PDCCH, a PFICH, and/or a PHICH in various embodiments. In some embodiments, the PDCCH can be allocated to at least nine of the one or more of the REGs, the PCFICH can be allocated to at least four of the one or more of the REGs and/or the PHICH can be allocated to at least three of the one or more of the REGs.

The logical or physical grouping 902 can also include an electrical component 910 for storing. The electrical component 910 for storing can be configured to store control, bandwidth, cell and/or REG allocation information.

Figure 10:
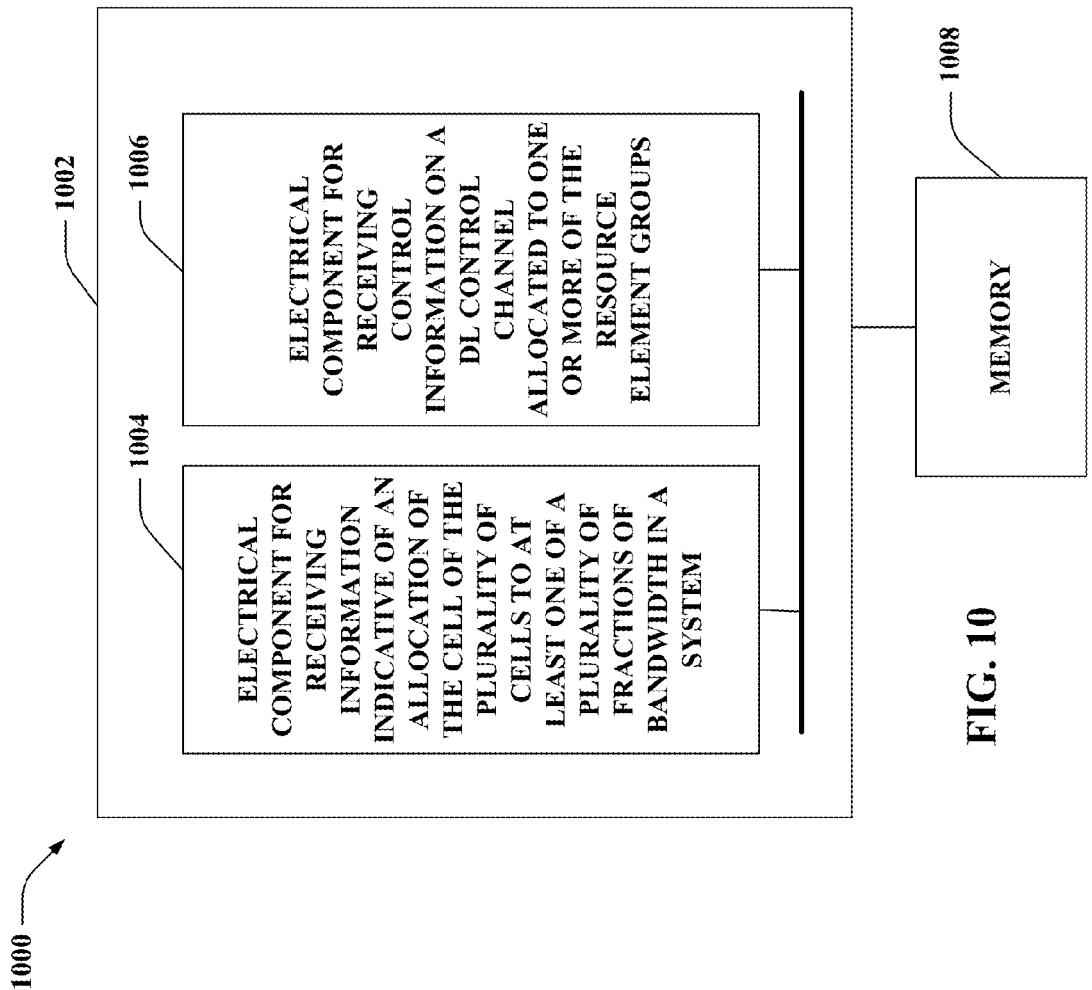

FIG. 10 is an illustration of a block diagram of an example system facilitating frequency reuse in DL control channels in accordance with various aspects set forth herein. It is to be appreciated that system 1000 is represented as including functional blocks, which can be functional blocks that represent functions implemented by a processor, hardware, software, firmware, or combination thereof. System 1000 can include a logical or physical grouping 1002 of electrical components for facilitating the frequency reuse.

The electrical components can act in conjunction. For instance, the logical or physical grouping 1002 can include an electrical component 1004 for receiving information indicative of an allocation of the cell of the plurality of cells to at least one of a plurality of fractions of bandwidth in a system, wherein REGs allocated to the plurality of fractions of bandwidth in a system are coordinated across the plurality of cells to provide frequency reuse of bandwidth in the system.

The logical or physical grouping 1002 can also include an electrical component 1006 for receiving control information on a DL control channel allocated to one or more of the REGs.

In some embodiments, the DL control channel is at least one of a PDCCH, a PCFICH or a PHICH. In some embodiments, the PDCCH is allocated to at least nine of the one or more of the REGs, wherein the PCFICH is allocated to at least four of the one or more of the REGs or wherein the PHICH is allocated to at least three of the one or more of the REGs.

The logical or physical grouping 1002 can also include an electrical component 1008 for storing. The electrical component 1008 for storing can be configured to store control, bandwidth, cell and/or REG allocation information.

A wireless multiple-access communication system can simultaneously support communication for multiple wireless access terminals. As mentioned above, each terminal can communicate with one or more BSs via transmissions on the forward and reverse links The forward link (or downlink) refers to the communication link from the BSs to the terminals, and the reverse link (or uplink) refers to the communication link from the terminals to the BSs. This communication link can be established via a single-in-single-out system, a multiple-in-multiple-out (MIMO) system, or some other type of system.

A MIMO system employs multiple ($N_T$) transmit antennas and multiple ($N_R$) receive antennas for data transmission. A MIMO channel formed by the $N_T$ transmit and $N_R$ receive antennas can be decomposed into $N_S$ independent channels, which are also referred to as spatial channels, where $N_S \leq \min\{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized.

A MIMO system can support time division duplex (TDD) and frequency division duplex (FDD). In a TDD system, the forward and reverse link transmissions are on the same frequency region so that the reciprocity principle allows the estimation of the forward link channel from the reverse link channel. This enables the access point to extract transmit beam-forming gain on the forward link when multiple antennas are available at the access point.

Figure 11:
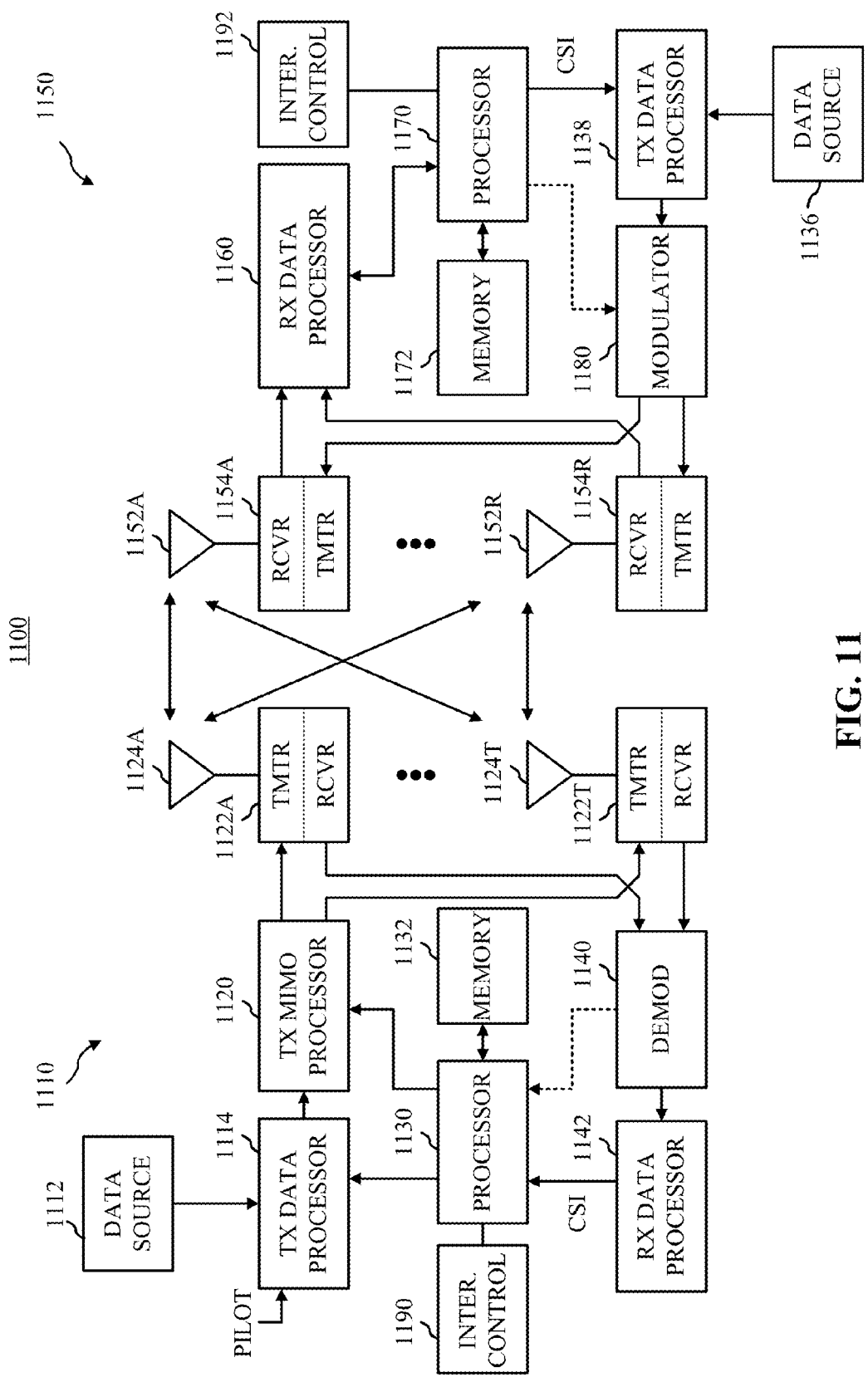
FIG. 11 shows an example wireless communication system in which the embodiments described herein can be employed in accordance with various aspects set forth herein.

FIG. 11 shows an example wireless communication system in which the embodiments described herein can be employed in accordance with various aspects set forth herein. The teachings herein may be incorporated into a node (e.g., a device) employing various components for communicating with at least one other node. FIG. 11 depicts several sample components that may be employed to facilitate communication between nodes. Specifically, FIG. 11 illustrates a wireless device 1110 (e.g., an access point) and a wireless device 1150 (e.g., an access terminal) of a wireless communication system 1100 (e.g., MIMO system). At the device 1110, traffic data for a number of data streams is provided from a data source 1112 to a transmit (TX) data processor 1114.

In some aspects, each data stream is transmitted over a respective transmit antenna. The TX data processor 1114 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by a processor 1130. A data memory 1132 may store program code, data, and other information used by the processor 1130 or other components of the device 1110.

The modulation symbols for all data streams are then provided to a TX MIMO processor 1120, which may further process the modulation symbols (e.g., for OFDM). The TX MIMO processor 1120 then provides $N_T$ modulation symbol streams to $N_T$ transceivers (XCVR) 1122A through 1122T. In some aspects, the TX MIMO processor 1120 applies beam-forming weights to the symbols of the data streams and to the antenna from which the symbol is being transmitted.

Each transceiver 1122 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transceivers 1122A through 1122T are then transmitted from $N_T$ antennas 1124A through 1124T, respectively.

At the device 1150, the transmitted modulated signals are received by $N_R$ antennas 1152A through 1152R and the received signal from each antenna 1152 is provided to a respective transceiver (XCVR) 1154A through 1154R. Each transceiver 1154 conditions (e.g., filters, amplifies, and downconverts) a respective received signal, digitizes the conditioned signal to provide samples, and further processes the samples to provide a corresponding "received" symbol stream.

A receive (RX) data processor 1160 then receives and processes the $N_R$ received symbol streams from $N_R$ transceivers 1154 based on a particular receiver processing technique to provide $N_T$ "detected" symbol streams. The RX data processor 1160 then demodulates, deinterleaves, and decodes each detected symbol stream to recover the traffic data for the data stream. The processing by the RX data processor 1160 is complementary to that performed by the TX MIMO processor 1120 and the TX data processor 1114 at the device 1110.

A processor 1170 periodically determines which pre-coding matrix to use (discussed below). The processor 1170 formulates a reverse link message comprising a matrix index portion and a rank value portion. A data memory 1172 may store program code, data, and other information used by the processor 1170 or other components of the device 1150.

The reverse link message may comprise various types of information regarding the communication link and/or the received data stream. The reverse link message is then processed by a TX data processor 1138, which also receives traffic data for a number of data streams from a data source 1136, modulated by a modulator 1180, conditioned by the transceivers 1154A through 1154R, and transmitted back to the device 1110.

At the device 1110, the modulated signals from the device 1150 are received by the antennas 1124, conditioned by the transceivers 1122, demodulated by a demodulator (DEMOD) 1140, and processed by a RX data processor 1142 to extract the reverse link message transmitted by the device 1150. The processor 1130 then determines which pre-coding matrix to use for determining the beam-forming weights then processes the extracted message.

FIG. 11 also illustrates that the communication components may include one or more components that perform interference control operations as taught herein. For example, an interference (INTER.) control component 1190 may cooperate with the processor 1130 and/or other components of the device 1110 to send/receive signals to/from another device (e.g., device 1150) as taught herein. Similarly, an interference control component 1192 may cooperate with the processor 1170 and/or other components of the device 1150 to send/receive signals to/from another device (e.g., device 1110). It should be appreciated that for each device 1110 and 1150 the functionality of two or more of the described components may be provided by a single component. For example, a single processing component may provide the functionality of the interference control component 1190 and the processor 1130 and a single processing component may provide the functionality of the interference control component 1192 and the processor 1170.

In an aspect, logical channels can be classified into Control Channels and Traffic Channels. Logical Control Channels can include a Broadcast Control Channel (BCCH), which is a DL channel for broadcasting system control information. Further, Logical Control Channels can include a Paging Control Channel (PCCH), which is a DL channel that transfers paging information. Moreover, the Logical Control Channels can include a Multicast Control Channel (MCCH), which is a Point-to-multipoint DL channel used for transmitting Multimedia Broadcast and Multicast Service (MBMS) scheduling and control information for one or several Multicast Traffic Channels (MTCHs). Generally, after establishing a Radio Resource Control (RRC) connection, this channel is only used by UEs that receive MBMS (e.g., old MCCH+MSCH). Additionally, the Logical Control Channels can include a Dedicated Control Channel (DCCH), which is a Point-to-point bi-directional channel that transmits dedicated control information and can be used by UEs having a RRC connection. In an aspect, the Logical Traffic Channels can comprise a Dedicated Traffic Channel (DTCH), which is a Point-to-point bi-directional channel dedicated to one UE for the transfer of user information. Also, the Logical Traffic Channels can include an MTCH for Point-to-multipoint DL channel for transmitting traffic data.

In an aspect, Transport Channels are classified into DL and UL. DL Transport Channels can include a Broadcast Channel (BCH), a Downlink Shared Data Channel (DL-SDCH) and a Paging Channel (PCH). The PCH can support UE power saving (e.g., Discontinuous Reception (DRX) cycle can be indicated by the network to the UE) by being broadcasted over an entire cell and being mapped to Physical layer (PHY) resources that can be used for other control/traffic channels. The UL Transport Channels can comprise a Random Access Channel (RACH), a Request Channel (REQCH), an Uplink Shared Data Channel (UL-SDCH) and a plurality of PHY channels.

The PHY channels can include a set of DL channels and UL channels. For example, the DL PHY channels can include: Common Pilot Channel (CPICH); Synchronization Channel (SCH); Common Control Channel (CCCH); Shared DL Control Channel (SDCCH); Multicast Control Channel (MCCH); Shared UL Assignment Channel (SUACH); Acknowledgement Channel (ACKCH); DL Physical Shared Data Channel (DL-PSDCH); UL Power Control Channel (UPCCH); Paging Indicator Channel (PICH); and/or Load Indicator Channel (LICH). By way of further illustration, the UL PHY Channels can include: Physical Random Access Channel (PRACH); Channel Quality Indicator Channel (CQICH); Acknowledgement Channel (ACKCH); Antenna Subset Indicator Channel (ASICH); Shared Request Channel (SREQCH); UL Physical Shared Data Channel (UL-PSDCH); and/or Broadband Pilot Channel (BPICH).

It is to be understood that the embodiments described herein can be implemented in hardware, software, firmware, middleware, microcode, or any combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors and/or other electronic units designed to perform the functions described herein, or a combination thereof.

When the embodiments are implemented in software, firmware, middleware or microcode, program code or code segments, they can be stored in a machine-readable medium (or a computer-readable medium), such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method for facilitating frequency reuse on downlink control channels in a wireless communication system by overbooking the downlink control channel, the method comprising:

determining a first number of symbols to support transmission of control information on a downlink control channel, wherein the first number of symbols to support transmission of control information on a downlink control channel is a minimum number for supporting transmission;

overbooking the downlink control channel by configuring a second number of symbols for transmission of control information on the downlink control channel, wherein the second number of symbols for transmission of control information on the downlink control channel is greater than the first number of symbols;

wherein the overbooking further comprises assigning a number of downlink control channels based, at least, on the second number of symbols for transmission of control information on the downlink control channel, wherein the number of downlink control channels based, at least, on the second number of symbols for transmission of control information on the downlink control channel is increased relative to a number of downlink control channels corresponding to the first number of symbols to support transmission of control information on a downlink control channel; and transmitting control information over the assigned number of downlink control channels to facilitate frequency reuse based on the overbooking, wherein the transmitted control information comprises a subset of the configured second number of symbols equal to the determined first number of symbols to facilitate the frequency reuse.

2. The method of claim 1, wherein the transmitting of the control information over the assigned number of downlink control channels is configured to achieve an effective reuse factor less than one.

3. The method of claim 2, wherein the effective reuse factor is no more than the first number of symbols to support transmission of control information on a downlink control channel divided by the second number of symbols for transmission of control information on the downlink control channel.

4. The method of claim 1, wherein the downlink control channel is a physical downlink control channel, and wherein symbols to support transmission of control information on a downlink control channel are orthogonal frequency division multiplexing symbols.

5. The method of claim 1, wherein the downlink control channel is at least one of a physical control format indicator channel or a physical hybrid automatic repeat request indicator channel, and wherein symbols to support transmission of control information on a downlink control channel are orthogonal frequency division multiplexing symbols.

6. The method of claim 1, wherein the second number of symbols for transmission of control information on the downlink control channel is based, at least, on a system bandwidth of the wireless communication system, a subframe type of the wireless communication system or channel conditions in the wireless communication system.

7. The method of claim 6, wherein the second number of symbols for transmission of control information on the downlink control channel is three symbols if the system bandwidth of the wireless communication system is greater than 10 resource blocks.

8. The method of claim 6, wherein the second number of symbols for transmission of control information on the downlink control channel is up to two symbols if the subframe type of the wireless communication system is a multimedia broadcast over a single frequency network or a special subframe in the wireless communication system operating according a time division duplex protocol.

9. A computer program product, comprising:
a non-transitory computer-readable medium, comprising:
a first set of codes for causing a computer to determine a first number of symbols to support transmission of control information on a downlink control channel, wherein the first number of symbols to support transmission of control information on a downlink control channel is a minimum number for supporting transmission;
a second set of codes for causing the computer to overbook the downlink control channel by configuring a second number of symbols for transmission of control information on the downlink control channel, wherein the second number of symbols for transmission of control information on the downlink control channel is greater than the first number of symbols;
wherein the overbooking further comprises assigning a number of downlink control channels based, at least, on the second number of symbols for transmission of control information on the downlink control channel, wherein the number of downlink control channels based, at least, on the second number of symbols for transmission of control information on the downlink control channel is increased relative to a number of downlink control channels corresponding to the first number of symbols to support transmission of control information on a downlink control channel;
a third set of codes for causing the computer to transmit control information over the assigned number of downlink control channels to facilitate frequency reuse based on the overbooking, wherein the transmitted control information comprises a subset of the configured second number of symbols equal to the determined first number of symbols to facilitate the frequency reuse.

10. The computer program product of claim 9, wherein the fourth set of codes for causing the computer to transmit the control information over the assigned number of downlink control channels is configured to achieve an effective reuse factor less than one.

11. The computer program product of claim 10, wherein the effective reuse factor is no more than the first number of symbols to support transmission of control information on a downlink control channel divided by the second number of symbols for transmission of control information on the downlink control channel.

12. The computer program product of claim 9, wherein the downlink control channel is a physical downlink control channel, and wherein symbols to support transmission of control information on a downlink control channel are orthogonal frequency division multiplexing symbols.

13. The computer program product of claim 9, wherein the downlink control channel is at least one of a physical control format indicator channel or a physical hybrid automatic repeat request indicator channel, and wherein symbols to support transmission of control information on a downlink control channel are orthogonal frequency division multiplexing symbols.

14. The computer program product of claim 9, wherein the second number of symbols for transmission of control information on the downlink control channel is based, at least, on a system bandwidth of a wireless communication system including the computer, a subframe type of the wireless communication system including the computer or channel conditions in the wireless communication system including the computer.

15. The computer program product of claim 14, wherein the second number of symbols for transmission of control information on the downlink control channel is three symbols if the system bandwidth of the wireless communication system including the computer is greater than 10 resource blocks.

16. The computer program product of claim 14, wherein the second number of symbols for transmission of control information on the downlink control channel is up to two symbols if the subframe type of the wireless communication system including the computer is a multimedia broadcast over a single frequency network or a special subframe in the wireless communication system including the computer operating according a time division duplex protocol.

17. An apparatus, comprising:
- means for determining a first number of symbols to support transmission of control information on a downlink control channel, wherein the first number of symbols to support transmission of control information on a downlink control channel is a minimum number for supporting transmission;
- means for overbooking the downlink control channel by configuring a second number of symbols for transmission of control information on the downlink control channel, wherein the second number of symbols for transmission of control information on the downlink control channel is greater than the first number of symbols;
- wherein the overbooking further comprises assigning a number of downlink control channels based, at least, on the second number of symbols for transmission of control information on the downlink control channel, wherein the number of downlink control channels based, at least, on the second number of symbols for transmission of control information on the downlink control channel is increased relative to a number of downlink control channels corresponding to the first number of symbols to support transmission of control information on a downlink control channel; and
- means for transmitting control information over the assigned number of downlink control channels to facilitate frequency reuse based on the overbooking, wherein the transmitted control information comprises a subset of the configured second number of symbols equal to the determined first number of symbols to facilitate the frequency reuse.

18. The apparatus of claim 17, wherein the means for transmitting the control information over the assigned number of downlink control channels is configured to achieve an effective reuse factor less than one.

19. The apparatus of claim 18, wherein the effective reuse factor is no more than the first number of symbols to support transmission of control information on a downlink control channel divided by the second number of symbols for transmission of control information on the downlink control channel.

20. The apparatus of claim 17, wherein the downlink control channel is a physical downlink control channel, and wherein symbols to support transmission of control information on a downlink control channel are orthogonal frequency division multiplexing symbols.

21. The apparatus of claim 17, wherein the downlink control channel is at least one of a physical control format indicator channel or a physical hybrid automatic repeat request indicator channel, and wherein symbols to support transmission of control information on a downlink control channel are orthogonal frequency division multiplexing symbols.

22. The apparatus of claim 17, wherein the second number of symbols for transmission of control information on the downlink control channel is based, at least, on a system bandwidth of a wireless communication system including the apparatus, a subframe type of the wireless communication system including the apparatus or channel conditions in the wireless communication system including the apparatus.

23. The apparatus of claim 22, wherein the second number of symbols for transmission of control information on the downlink control channel is three symbols if the system bandwidth of the wireless communication system including the apparatus is greater than 10 resource blocks.

24. The apparatus of claim 22, wherein the second number of symbols for transmission of control information on the downlink control channel is up to two symbols if the subframe type of the wireless communication system including the apparatus is a multimedia broadcast over a single frequency network or a special subframe in the wireless communication system including the apparatus operating according a time division duplex protocol.

25. An apparatus, comprising:
- a resource allocation module configured to:
  - determine a first number of symbols to support transmission of control information on a downlink control channel, wherein the first number of symbols to support transmission of control information on a downlink control channel is a minimum number for supporting transmission;
  - overbook the downlink control channel by configuring a second number of symbols for transmission of control information on the downlink control channel, wherein the second number of symbols for transmission of control information on the downlink control channel is greater than the first number of symbols;
  - wherein the overbooking further comprises assigning a number of downlink control channels based, at least, on the second number of symbols for transmission of control information on the downlink control channel, wherein the number of downlink control channels based, at least, on the second number of symbols for transmission of control information on the downlink control channel is increased relative to a number of downlink control channels corresponding to the first number of symbols to support transmission of control information on a downlink control channel; and
- a transmitter configured to transmit control information over the assigned number of downlink control channels to facilitate frequency reuse based on the overbooking, wherein the transmitted control information comprises a subset of the configured second number of symbols equal to the determined first number of symbols to facilitate the frequency reuse.

26. The apparatus of claim 25, wherein the transmitter configured to transmit the control information over the assigned number of downlink control channels is configured to achieve an effective reuse factor less than one.

27. The apparatus of claim 26, wherein the effective reuse factor is no more than the first number of symbols to support transmission of control information on a downlink control channel divided by the second number of symbols for transmission of control information on the downlink control channel.

28. The apparatus of claim 25, wherein the downlink control channel is a physical downlink control channel, and wherein symbols to support transmission of control information on a downlink control channel are orthogonal frequency division multiplexing symbols.

29. The apparatus of claim 25, wherein the downlink control channel is at least one of a physical control format indicator channel or a physical hybrid automatic repeat request indicator channel, and wherein symbols to support transmission of control information on a downlink control channel are orthogonal frequency division multiplexing symbols.

30. The apparatus of claim 25, wherein the second number of symbols for transmission of control information on the downlink control channel is based, at least, on a system bandwidth of a wireless communication system including the apparatus, a subframe type of the wireless communication system including the apparatus or channel conditions in the wireless communication system including the apparatus.

31. The apparatus of claim 30, wherein the second number of symbols for transmission of control information on the downlink control channel is three symbols if the system bandwidth of the wireless communication system including the apparatus is greater than 10 resource blocks.

32. The apparatus of claim 30, wherein the second number of symbols for transmission of control information on the downlink control channel is up to two symbols if the subframe type of the wireless communication system including the apparatus is a multimedia broadcast over a single frequency network or a special subframe in the wireless communication system including the apparatus operating according a time division duplex protocol.

\* \* \* \* \*